United States Patent
Baek et al.

(10) Patent No.: US 11,231,782 B2
(45) Date of Patent: Jan. 25, 2022

(54) ELECTRONIC DEVICE FOR PROVIDING TIME INFORMATION AND OPERATION METHOD OF ELECTRONIC DEVICE

(71) Applicant: Samsung Electronics Co., Ltd., Gyeonggi-do (KR)

(72) Inventors: Inho Baek, Gyeonggi-do (KR); Sunyoung Yi, Gyeonggi-do (KR); Minsun Park, Seoul (KR); Wonjun Lee, Gyeonggi-do (KR); Soojung Lee, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/647,703

(22) PCT Filed: Jul. 18, 2018

(86) PCT No.: PCT/KR2018/008126
§ 371 (c)(1),
(2) Date: Mar. 16, 2020

(87) PCT Pub. No.: WO2019/088400
PCT Pub. Date: May 9, 2019

(65) Prior Publication Data
US 2020/0278749 A1    Sep. 3, 2020

(30) Foreign Application Priority Data
Nov. 3, 2017  (KR) .......................... 10-2017-0146202

(51) Int. Cl.
*G06F 3/01*     (2006.01)
*G04B 25/02*    (2006.01)
(52) U.S. Cl.
CPC ............. *G06F 3/016* (2013.01); *G04B 25/02* (2013.01)

(58) Field of Classification Search
CPC ................................ G06F 3/016; G04B 25/02
See application file for complete search history.

(56) References Cited

U.S. PATENT DOCUMENTS

| | | | |
|---|---|---|---|
| 5,559,761 | A | 9/1996 | Frenkel et al. |
| 6,052,339 | A | 4/2000 | Frenkel et al. |
| (Continued) | | | |

FOREIGN PATENT DOCUMENTS

| | | |
|---|---|---|
| JP | 08226983 | 9/1996 |
| JP | 11014764 | 1/1999 |
| (Continued) | | |

OTHER PUBLICATIONS

PCT/ISA/210 Search Report issued on PCT/KR2018/008126, pp. 5.
PCT/ISA/237 Written Opinion issued on PCT/KR2018/008126, pp. 4.

*Primary Examiner* — Tadesse Hailu
(74) *Attorney, Agent, or Firm* — The Farrell Law Firm, P.C.

(57) ABSTRACT

In an electronic device for providing time information and an operation method of the electronic device according to various embodiments, the electronic device includes: a display which displays first time information and second time information; an actuator which outputs vibrations respectively corresponding to the first time information and the second time information; and a processor, wherein the processor can be configured to: check the starting position of a user input in response to sensing the start of the user input on the display; determine, on the basis of the start position, a first region that corresponds to the first time information and a second region that corresponds to the second time information; and control the actuator so that a first vibration that indicates the first time information is output in response to the sensing of a user input in the first region, and a second vibration that indicates the second time information is output (Continued)

in response to the sensing of a user input in the second region.

12 Claims, 22 Drawing Sheets

(56)  References Cited

U.S. PATENT DOCUMENTS

| | | |
|---|---|---|
| 2004/0042347 A1 | 3/2004 | Born et al. |
| 2015/0045000 A1* | 2/2015 | Kim ............... H04M 1/663 |
| | | 455/411 |
| 2015/0105125 A1* | 4/2015 | Min ............... G04C 3/002 |
| | | 455/566 |
| 2015/0172438 A1* | 6/2015 | Yang ............. G04G 9/0064 |
| | | 455/419 |
| 2015/0293592 A1* | 10/2015 | Cheong ........... G06F 3/0416 |
| | | 345/173 |
| 2016/0034887 A1* | 2/2016 | Lee ............... G06Q 20/321 |
| | | 705/39 |
| 2016/0283094 A1* | 9/2016 | Choi ............. G06F 3/04817 |
| 2016/0313810 A1* | 10/2016 | Kim .............. G06F 1/169 |
| 2016/0357386 A1* | 12/2016 | Choi ............. G06F 3/0421 |
| 2017/0011210 A1* | 1/2017 | Cheong ........... H04W 4/00 |
| 2017/0160898 A1* | 6/2017 | Lee .............. G06F 3/041 |
| 2017/0220005 A1 | 8/2017 | Han et al. |
| 2017/0220137 A1* | 8/2017 | Han ............... G06F 3/0362 |
| 2018/0164973 A1* | 6/2018 | Kim .............. G04C 17/0091 |
| 2018/0188925 A1* | 7/2018 | Na ............... G06F 3/04847 |
| 2018/0364650 A1* | 12/2018 | Mansour .......... G06F 3/016 |
| 2019/0332173 A1* | 10/2019 | Wellen ........... G06F 3/04883 |

FOREIGN PATENT DOCUMENTS

| | | |
|---|---|---|
| JP | 2004093568 | 3/2004 |
| JP | 2009122011 | 6/2009 |
| KR | 101603266 | 3/2016 |
| KR | 1020170065144 | 6/2017 |

* cited by examiner

2 : 25

ELECTRONIC DEVICE FOR PROVIDING TIME INFORMATION AND OPERATION METHOD OF ELECTRONIC DEVICE

PRIORITY

This application is a National Phase Entry of PCT International Application No. PCT/KR2018/008126 which was filed on Jul. 18, 2018, and claims priority to Korean Patent Application No. 10-2017-0146202, which was filed on Nov. 3, 2017, the content of each of which is incorporated herein by reference.

TECHNICAL FIELD

Various embodiments of the disclosure relate to an electronic device for providing time information and an operating method of the electronic device.

BACKGROUND ART

Various electronic devices, such as a smartphone, a tablet personal computer (PC), a portable multimedia player (PMP), a personal digital assistant (PDA), a laptop PC, and a wearable device, are being widely used.

Various electronic devices are provided with an actuator to output vibrations, thus providing various pieces of information, such as time information and a notification, using a method of outputting vibrations. Furthermore, recent electronic devices may transmit feedback on a user input to a user using vibrations while the user is performing an input.

Providing various pieces of information using vibrations output from an actuator of an electronic device may be useful for a user who is visually impaired, because a visually impaired user cannot identify information output on a display. Further, when a user using an electronic device identifies information using a display in a dark environment due to low light, the user may have inconvenience, such as being blinded. Thus, providing information using vibrations may be useful for different users.

DETAILED DESCRIPTION OF INVENTION

Technical Problem

Among techniques for providing time information using vibrations, there is a technique for providing time information using a method of outputting vibrations when a user input is detected at a specific position on a display. For example, when a user input is detected in a region indicating a time in an electronic device with a clock application being activated, time information corresponding to the detected region may be provided by outputting a vibration. A user may detect the vibration using a tactile sense and may obtain time information corresponding to the vibration. The user may find a reference position (e.g., a region indicating 12 o'clock) to obtain time information and may find a position where the vibration occurs while performing the user input from the reference position, thereby obtaining the time information.

However, when the user performs user input with respect to the reference position (e.g., the region corresponding to 12 o'clock) using only the tactile sense, the user needs to perform a plurality of inputs on a display until finding the reference position.

Solution to Problem

An electronic device according to various embodiments may include: a display to display first time information and second time information; an actuator configured to output vibrations respectively corresponding to the first time information and the second time information; and a processor, wherein the processor may: identify a start position of a user input upon detecting a start of the user input on the display; determine, based on the start position, a first region corresponding to the first time information and a second region corresponding to the second time information; control the actuator to output a first vibration indicating the first time information upon detecting the user input in the first region; and control the actuator to output a second vibration indicating the second time information upon detecting the user input in the second region.

An electronic device according to various embodiments of the disclosure may include: a display to display first time information and second time information; an actuator configured to output vibrations respectively corresponding to the first time information and the second time information; and a processor, wherein the processor may be configured to detect the start of the user input, and to control the actuator to output the first vibration indicating the first time information when the user input is moved by a first setting value or greater and to output the second vibration indicating the second time information when the user input is moved by a second setting value or greater, the second setting value being greater than the first setting value.

An operating method of an electronic device according to various embodiments of the disclosure may include: receiving a user input; determining, based on a start position of the user input, a first region corresponding to first time information and a second region corresponding to second time information; outputting a first vibration indicating the first time information upon detecting the user input in the first region; and outputting a second vibration indicating the second time information upon detecting the user input in the second region.

Advantageous Effects of Invention

An electronic device for providing time information and an operating method of the electronic device according to various embodiments of the disclosure may set a position at which a user input is first detected as a reference location, thus providing time information to a user regardless of the reference location.

An electronic device for providing time information and an operating method of the electronic device according to various embodiments of the disclosure may set a position at which a user input is first detected as a reference location and may determine a region for outputting a vibration indicating time information, based on the difference between a reference time and a time when the user input is detected, thereby providing convenience that the user does not need to try to find a reference point.

MODE FOR CARRYING OUT THE INVENTION

Figure 1:
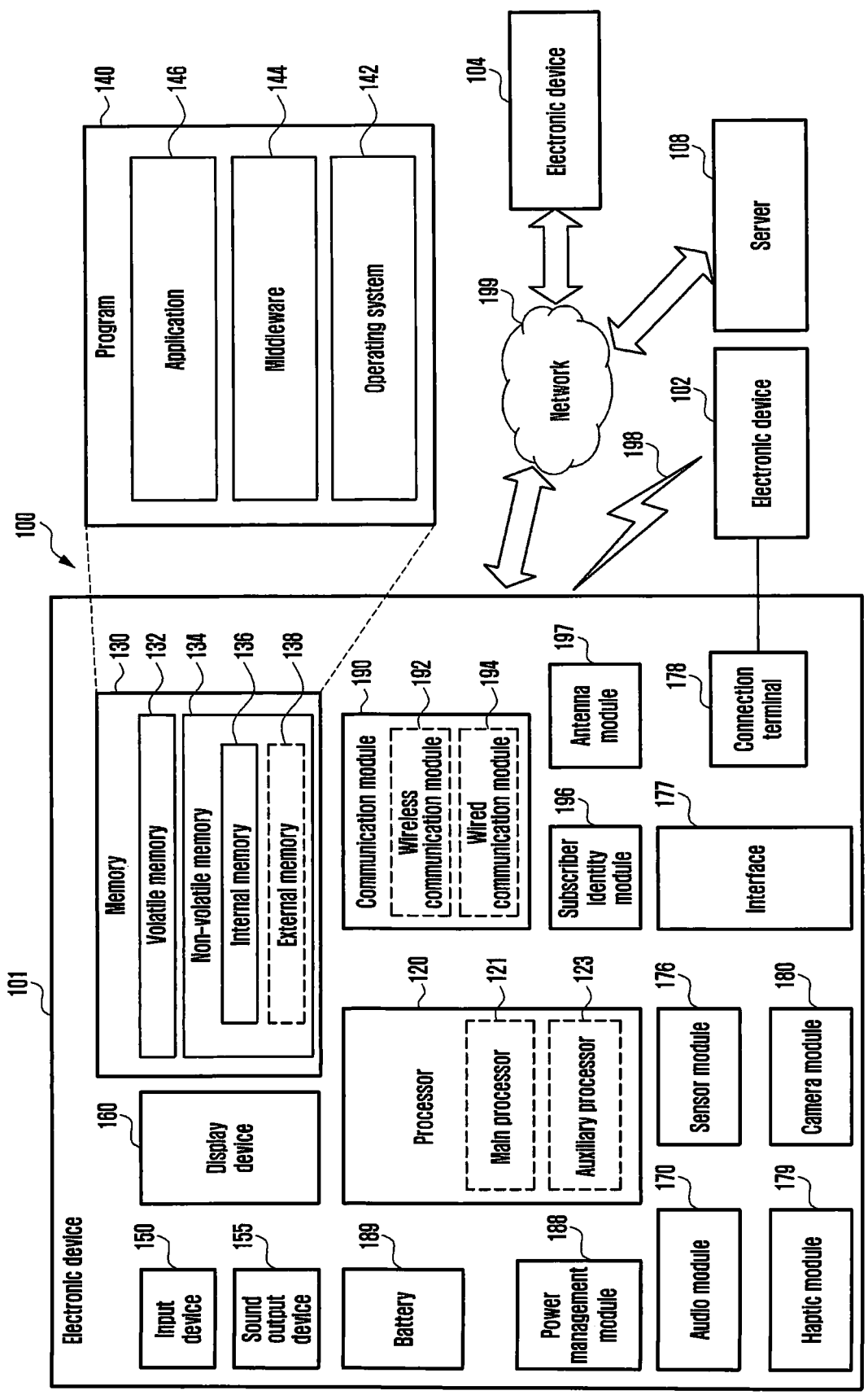
FIG. 1 is a block diagram illustrating an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processor (CPU) or an application processor (AP)), and an auxiliary processor 123 (e.g., a graphics processor (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
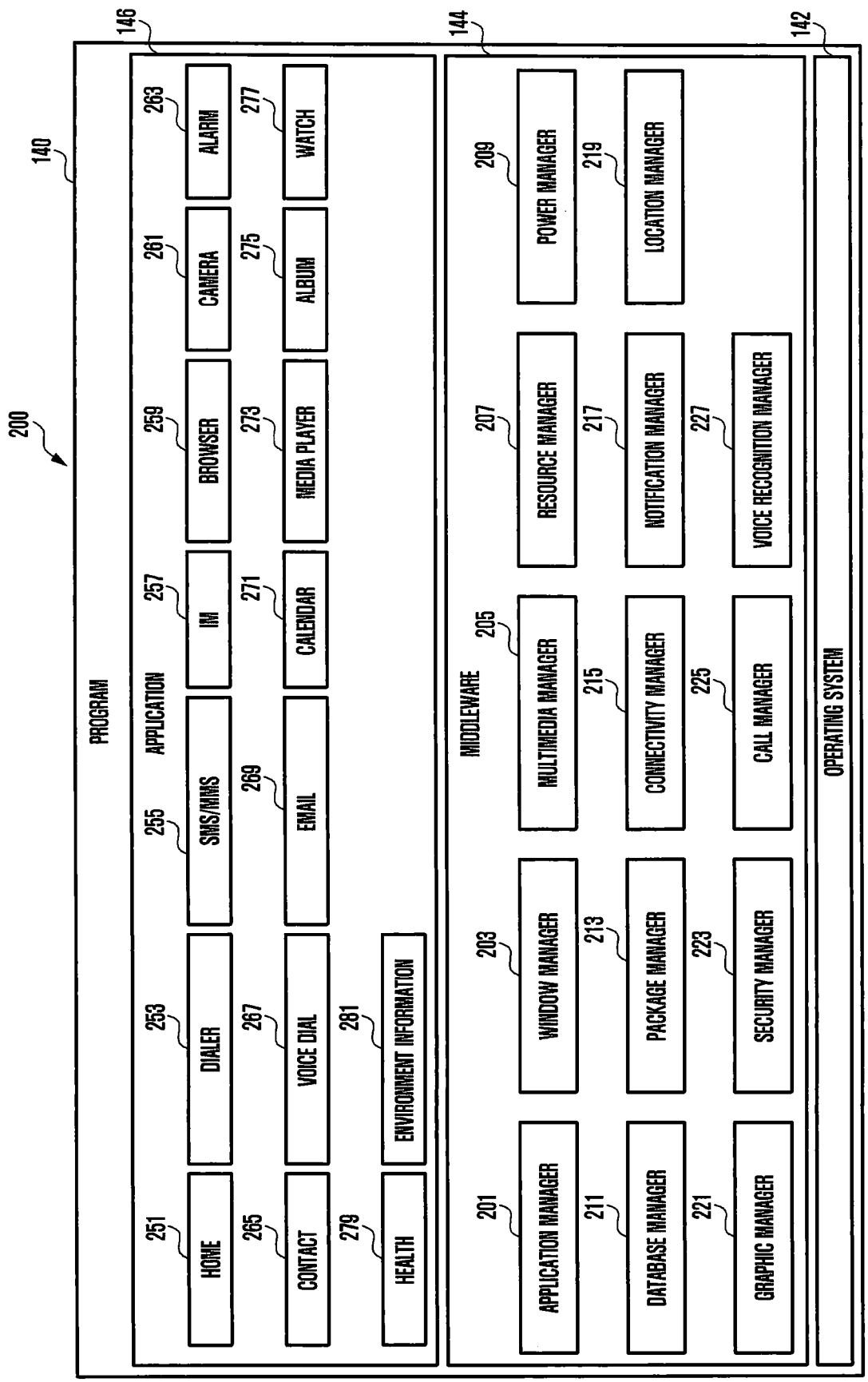
FIG. 2 is a block diagram illustrating a camera module of an electronic device according to various embodiments of the disclosure.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227. The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects. The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101. The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
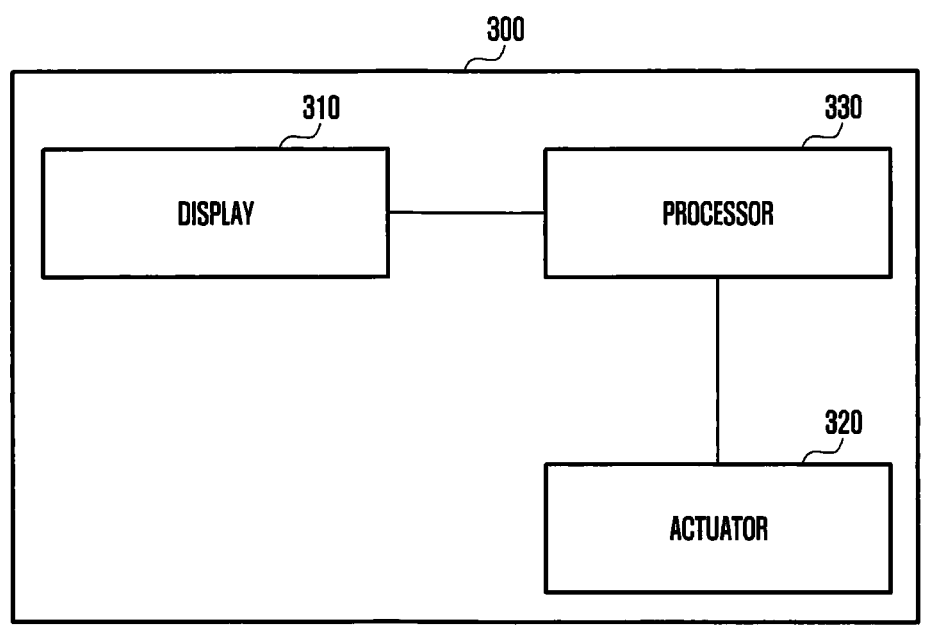
FIG. 3 is a block diagram illustrating an electronic device according to various embodiments of the disclosure.

FIG. 3 is a block diagram illustrating an electronic device according to various embodiments of the disclosure.

Referring to FIG. 3, the electronic device 300 according to various embodiments of the disclosure may include a display 310, an actuator 320, and a processor 330.

The display 310 (e.g., the display device 160 of FIG. 1) may display various pieces of information under the control of the processor 330. According to various embodiments of the disclosure, the display 310 may display first time information and second time information. According to various embodiments of the disclosure, the first time information may refer to time information indicating an hour at a specific time, and the second time information may refer to time information indicating a minute at the specific time. For example, when a user input starts at 8:45, the first time information may refer to hour information indicating eight o'clock, and the second time information may refer to minute information indicating 45 minutes.

According to various embodiments of the disclosure, the specific time may refer to a time at which a user input starts but is not limited thereto. According to various embodiments of the disclosure, the specific time may refer to various times to be provided to a user. For example, when an alarm application is executed in the electronic device 300, a time set to output an alarm may correspond to the specific time.

The display 310 may be configured with various materials, such as an LCD, an LED, an OLED, and the like, and may be manufactured in various shapes, such as a circular shape, a rectangular shape, and the like.

The actuator 320 (e.g., the haptic module 179 of FIG. 1) may refer to a module to output vibrations for providing various notifications to the user. According to various embodiments of the disclosure, the actuator 320 may output a vibration corresponding to the first time information and a vibration corresponding to the second time information. According to various embodiments of the disclosure, the actuator may provide feedback to the user using various principles. The actuator 320 may be configured as an inertial haptic actuator that generates vibrations through rotation. For example, the actuator 320 may be configured as an actuator that rotates using inertia (an eccentric rotating mass (ERM) actuator or a linear resonant actuator (LRA)). In another example, the actuator 320 may be configured as an electroactive polymer actuator that generates vibrations through relaxation and contraction when a chemical bonding structure inside a polymer is changed by an electric field. In still another example, the actuator 320 may be configured as an electrostatic force actuator that generates vibrations in a manner such that a touching surface directly vibrates. The actuator may be configured using various methods for generating vibrations in addition to the foregoing examples.

According to various embodiments of the disclosure, the vibration corresponding to the first time information and the vibration corresponding to the second time information may have different vibration patterns. Since the vibration corresponding to the first time information and the vibration corresponding to the second time information may have different vibration patterns, the user can distinguish between the vibration corresponding to the first time information and the vibration corresponding to the second time information. According to various embodiments of the disclosure, under the control of the processor 330, the actuator 320 may differently adjust various conditions, such as a vibration output time, vibration output duration, a vibration output cycle, a vibration output strength, and a vibration count and may differently output the vibration corresponding to the first time information and the vibration corresponding to the second time information. According to various embodiments of the disclosure, the actuator 320 may output a plurality of vibrations indicating the first time information or the second time information. When outputting the plurality of vibrations, the actuator 320 may differently output the strength, vibration count, and the like of each of the plurality of vibrations. Furthermore, the actuator 320 may dynamically control the strength and the like of each of the plurality of vibrations.

According to various embodiments of the disclosure, a plurality of actuators 320 may be provided. When there are a plurality of actuators 320, various feedbacks that can be implemented using the plurality of actuators 320, such as a tactile direction that the user can detect when the vibration indicating the first time information or the second time information is transmitted to the user, may be output.

The processor 330 (e.g., the processor 120 of FIG. 1) may control various functions of the electronic device 300 (e.g., the electronic device 101 of FIG. 1). According to various embodiments of the disclosure, the processor 330 may perform various functions of outputting the first time information and the second time information.

According to various embodiments of the disclosure, the processor 330 may control the display 310 to display the first time information and the second time information.

According to various embodiments of the disclosure, the processor 330 may control the actuator 320 to output the vibrations indicating the first time information and the second time information. Hereinafter, a specific embodiment in which the processor 330 outputs the vibration corresponding to the first time information and the vibration corresponding to the second time information will be described.

According to various embodiments of the disclosure, the processor 330 may identify whether a user input is detected on the display 310. According to various embodiments of the disclosure, the user input may include a touch input or a proximity input on the display 310. Upon detecting the user input is detected, the processor 330 may detect the start position of the user input. The processor 330 may identify first time information and second time information corresponding to the start time of the user input. For example, when the start time of the user input is 10:10, the processor 330 may identify the first time information indicating 10 o'clock and the second time information indicating 10 minutes.

According to various embodiments of the disclosure, the user input may be detected at any position on the display 310. For example, a user input to obtain time information may be detected at the edge of the display 310 but is not limited to the edge. According to various embodiments of the disclosure, the user input may be detected at any position on the electronic device 300 including the display 310.

According to various embodiments of the disclosure, the processor 330 may determine a first region corresponding to the first time information and a second region corresponding to the second time information, based on the start position of the user input. The first region may refer to a region where a first vibration corresponding to the first time information is output on the display 310. The second region may refer to a region where a second vibration corresponding to the second time information is output on the display 320. The first vibration may be output when the user input is detected in the first region while the user input is performed. The second vibration may be output when the user input is detected in the second region while the user input is performed. The output of the first vibration may continue while the user input is detected in the first region. When the user input is not detected in the first region, the output of the first vibration may be stopped. The output of the second vibration may continue while the user input is detected in the second region. When the user input is not detected in the second region, the output of the second vibration may be stopped.

According to various embodiments of the disclosure, the processor 330 may set the start position of the user input as a reference position. The reference position may refer to a position corresponding to a reference time. For example, the reference time may be 12:00, and the reference position may be a position corresponding to 12:00. The processor 330 may identify the start position of the user input and may set the start position as a position corresponding to 12:00.

According to various embodiments of the disclosure, the start position of the user input may be various positions on the display 310. The reference position may change according to the start position of the user input. As the reference position changes, the position of the first region corresponding to the first time information and the position of the second region corresponding to the second time information may also change.

According to various embodiments of the disclosure, the processor 330 may determine the relative position of the first region to the reference position, based on the difference between the hour of the reference time and an hour corresponding to the first time information. The processor 330 may determine the position of the first region, based on the reference position and the determined relative position. That is, the processor 330 may determine the first region, based on the difference between the reference time and the first time information and the start position. For example, when the reference time is 12 o'clock and the first time information is time information indicating 1 o'clock, the processor 330 may determine a region corresponding to the difference between 12 o'clock as the reference time and 1 o'clock included in the first time information from the start position of the user input as the first region. According to various embodiments of the disclosure, the position of the first region may be changed according to the start position of the user input.

According to various embodiments of the disclosure, the processor 330 may determine the relative position of the second region to the reference position, based on the difference between the reference time and a minute corresponding to the second time information. The processor 330 may determine the position of the second region, based on the reference position and the determined relative position. That is, the processor 330 may determine the second region, based on the difference between the reference time and the second time information and the start position. For example, when the reference time is 12 o'clock and the second time information is time information indicating 10 minutes, the processor 330 may determine a position corresponding to a difference of 10 minutes from the start position of the user input as the second region. According to various embodiments of the disclosure, the position of the second region may be changed according to the start position of the user input.

According to various embodiments of the disclosure, upon detecting the user input in the first region, the processor 330 may control the actuator 320 to output the first vibration indicating the first time information.

According to various embodiments of the disclosure, upon detecting the user input in the second region, the processor 330 may control the actuator 320 to output the second vibration indicating the second time information.

According to various embodiments of the disclosure, the processor 330 may determine a third region corresponding to third time information, based on the start position of the user input. The third time information may refer to information indicating a second at the time when the user input starts. Upon detecting the user input in the third region, the processor 330 may control the actuator 320 may to output a third vibration indicating the third time information.

For example, assuming that the user input is a drag input, the processor 330 may identify that the user input passes by the first region and the second region on the display 310 according to the drag input. When the user input passes by the first region on the display 310, the processor 330 may identify that the user input is detected in the first region. The processor 330 may control the actuator 320 to output the first vibration corresponding to the first time information. When the user input passes by the second region on the display 310, the processor 330 may identify that the user input is detected in the second region. The processor 330 may control the actuator 320 to output the second vibration corresponding to the second time information.

According to various embodiments of the disclosure, the electronic device 300 may allow the user to identify the first time information through the first vibration while the user input is passing by the first region and may allow the user to identify the second time information through the second vibration while the user input is passing by the second region.

According to various embodiments of the disclosure, when the display 310 includes a touch panel, the display 310 may also detect that the user input passes by the first region and the second region.

According to various embodiments of the disclosure, the processor 330 may determine the first region and the second region according to the position of the first region relative to the start position and the position of the second region relative to the start position on the basis of the difference between time information corresponding to the reference position and the first time information and the difference between the time information corresponding to the reference position and the second time information. Therefore, even though the user performs a user input in a region other than a specific region (e.g., a region indicating 12 o'clock) on the display 310, time information may be provided to the user.

Figure 4A:
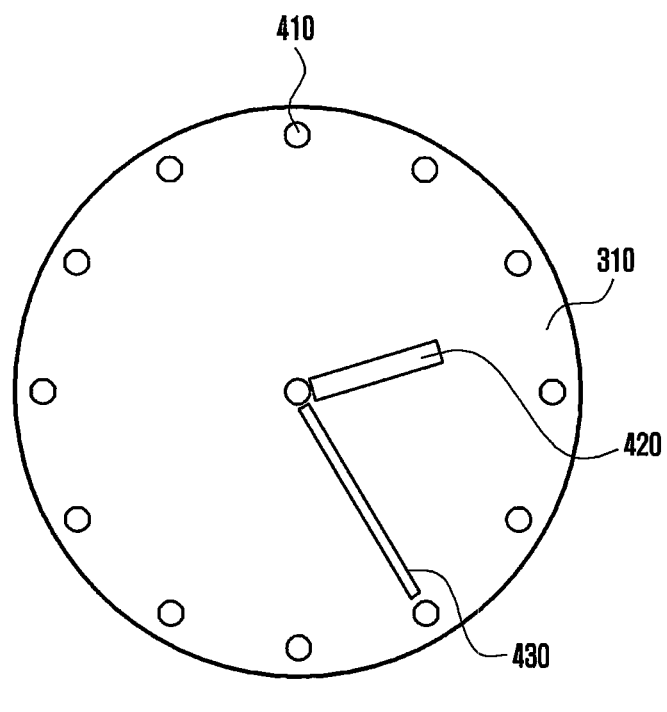
FIG. 4A to FIG. 5B illustrate a screen that can be displayed in an electronic device and a vibration that is output from the electronic device according to various embodiments of the disclosure.
Figure 4B:
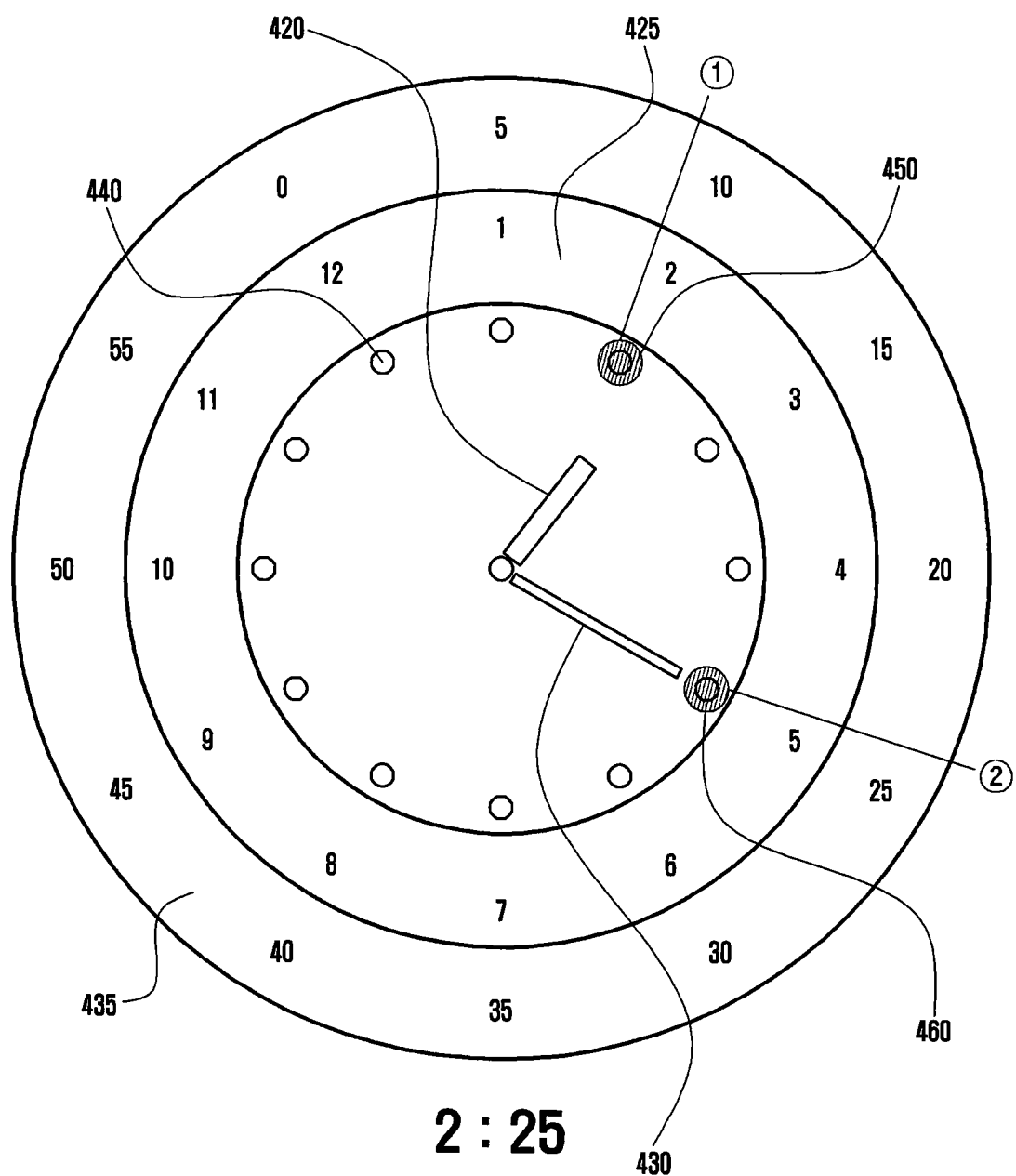
Figure 4C:
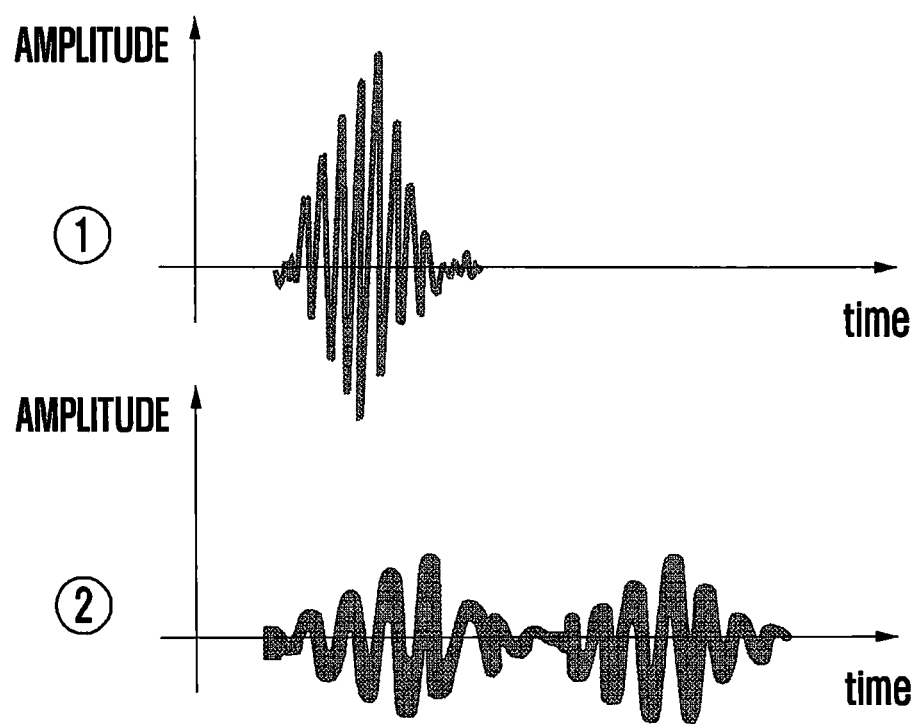

FIG. 4A to 4C illustrate an example of a screen that can be displayed in an electronic device and a vibration that is output from the electronic device according to various embodiments of the disclosure.

FIG. 4A shows an example of a screen displaying time information indicating 2:25 on a display 310 included in the electronic device (e.g., the electronic device 300 of FIG. 3).

In the screen displaying the time information, a reference position 410 may be located at the top of the display 310, and the electronic device 300 may display various pieces of time information, based on the reference position 410 indicating 12:00.

According to various embodiments of the disclosure, a processor (e.g., the processor 330 of FIG. 3) may control the display 310 to display first time information 420 indicating an hour and to display second time information 430 indicating a minute.

Referring to FIG. 4B, the electronic device (e.g., the electronic device 300 of FIG. 3) may detect a user-input and may identify the start position of the user input. In FIG. 4B, it is assumed that the start position of the user input is 440.

According to various embodiments of the disclosure, the processor (e.g., the processor 330 of FIG. 3) may set the start position 440 of a user input as a reference position and may identify first time information (e.g., 2 o'clock as hour information of the start position of the user input) and second time information (e.g., 25 minutes as minute information of the start position of the user input) corresponding to a specific time information (e.g., the start point of the user input).

According to various embodiments of the disclosure, the processor 330 may determine a first region, based on the reference position 440 and the difference between a reference time (12 o'clock) corresponding to the reference position and the first time information (2 o'clock). Referring to FIG. 4B, the reference position 440 is a position indicating 12 o'clock, and the processor 330 may determine a position 450 corresponding to the difference between the reference time (12 o'clock) and the first time information (2 o'clock) as the first region.

According to various embodiments of the disclosure, the processor 330 may determine a second region, based on the reference position 440 and the difference between minute information (0 minutes) included in the reference time corresponding to the reference position and the second time information (25 minutes). Referring to FIG. 4B, the reference position 440 is a position indicating 0 minutes, and the processor 330 may determine a position 460 corresponding to the difference between the reference time (0 minutes) and the second time information (25 minutes) as the second region.

According to various embodiments of the disclosure, upon detecting the user input in the first region, the processor 330 may control an actuator (e.g., the actuator 320 of FIG. 3) to output a first vibration ① corresponding to the first time information.

According to various embodiments of the disclosure, upon detecting the user input in the second region, the processor 330 may control the actuator (e.g., the actuator 320 of FIG. 3) to output a second vibration ② corresponding to the second time information. The first vibration ① and the second vibration ② may have different frequencies and amplitudes.

According to various embodiments of the disclosure, the processor 330 may display the first time information 420 and the second time information 430 on the display 310 while outputting the first vibration ① and the second vibration ② respectively corresponding to the first time information 420 and the second time information 430 according to the user input.

According to another embodiment of the disclosure, the processor 330 may deactivate some functions of the display 310 and my output the first vibration ① and the second vibration ② respectively corresponding to the first time information 420 and the second time information 430 according to the user input. The deactivated functions of the display 310 may include a function of displaying the first time information and the second time information.

FIG. 4C illustrates an example of a vibration pattern of the first vibration ① and the second vibration ②.

Referring to FIG. 4C, the first vibration ① may refer to a vibration having a larger amplitude and a smaller period than those of the second vibration ②. According to various embodiments of the disclosure, the first vibration and the second vibration are not limited to the vibration patterns illustrated in FIG. 4C, and the processor 330 may control the actuator 320 to output various vibrations.

Figure 5A:
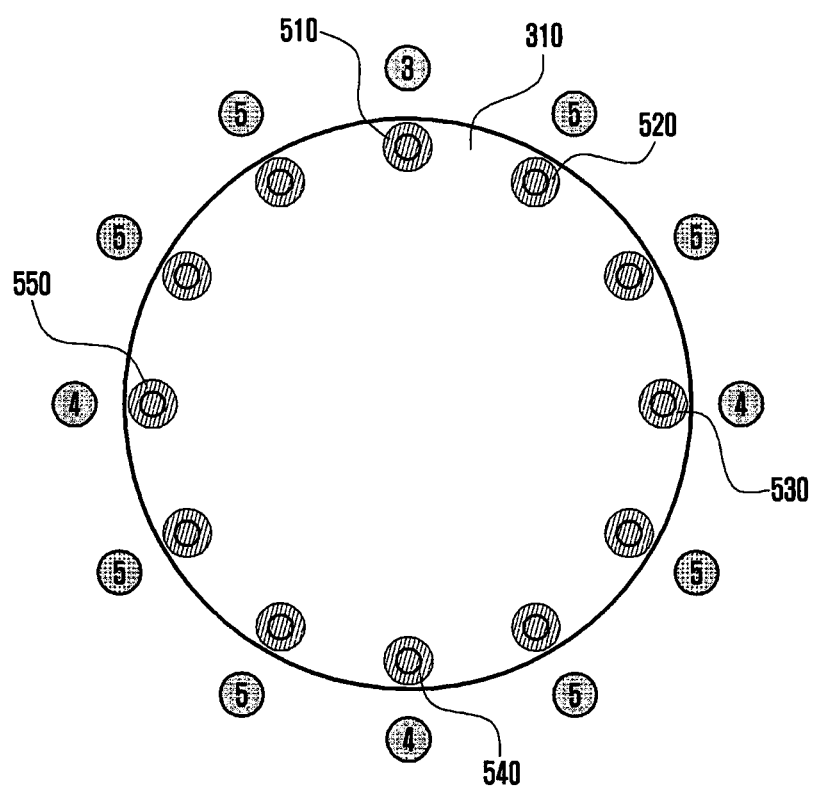
Figure 5B:
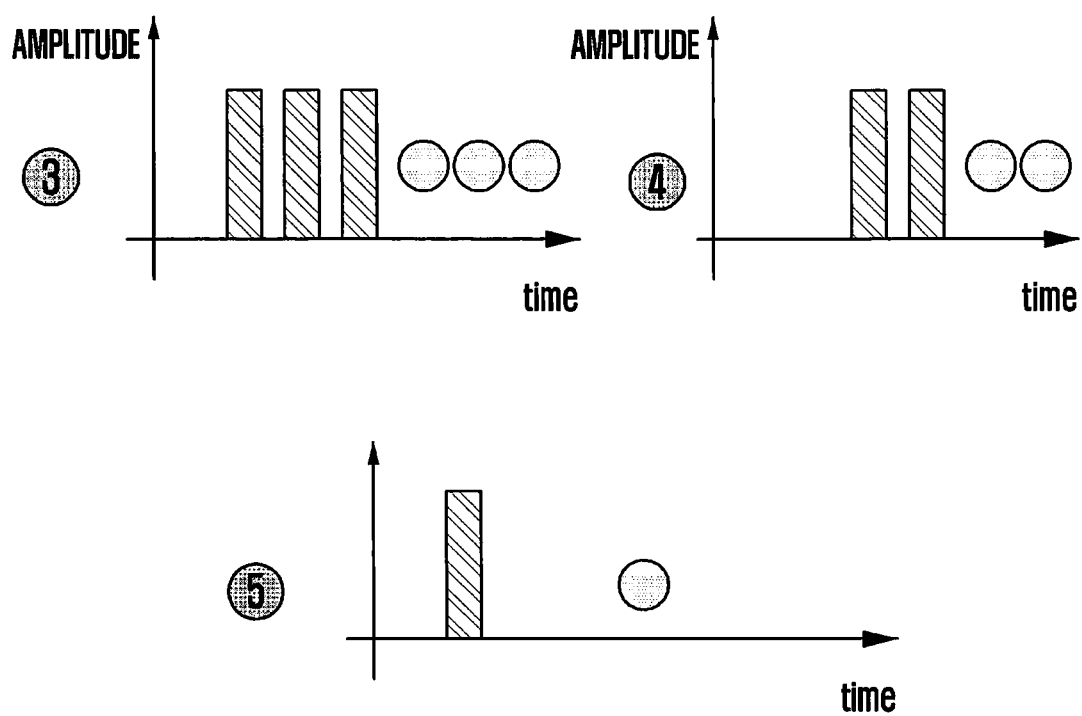

FIGS. 5A and 5B illustrate a screen that can be displayed in an electronic device and a vibration that is output from the electronic device according to various embodiments of the disclosure.

According to various embodiments of the disclosure, upon receiving the start of a user input, a processor 330 may control an actuator 320 to output a vibration ③ corresponding to the start 510 of the user input.

An electronic device (e.g., the electronic device 300 of FIG. 3) according to various embodiments of the disclosure may notify a user of a position on a display (e.g., the display 310 of FIG. 3). To this end, when a user input is detected in a specific region, the electronic device 300 may output a vibration ④ or ⑤ corresponding to the specific region and may notify the user that the user input passes by the specific region through the vibration. The position at which the user input is detected on the display may be a position corresponding to time information. For example, when the user input passes by a position 520 corresponding to 1 o'clock, the electronic device 300 may output a vibration ⑤ corresponding to 1 o'clock.

To this end, the processor (e.g., the processor 330 of FIG. 3) may determine at least one region indicating a position where a user input is detected, based on the start position of the user input. The at least one region may refer to a region corresponding to each time unit. For example, the processor 330 may determine various regions, such as a region indicating 1 o'clock, a region indicating 2 o'clock, and the like. When a user input is detected in the determined region, the processor 330 may control the actuator 320 to output a third vibration indicating a position on the display 320.

According to various embodiments of the disclosure, when a user input is detected in a specific region among determined regions, the processor 330 may control the actuator 320 to output a vibration ④ other than a vibration ⑤ corresponding to the other regions. Referring to FIG. 5B, the vibration ④ corresponding to a region 530 indicating 3 o'clock, a region 540 indicating 6 o'clock, and a region 550 indicating 9 o'clock may be set to be produced a plurality of times compared to the vibration ⑤ corresponding to the other regions (e.g., a region 520 indicating 1 o'clock).

Figure 6:
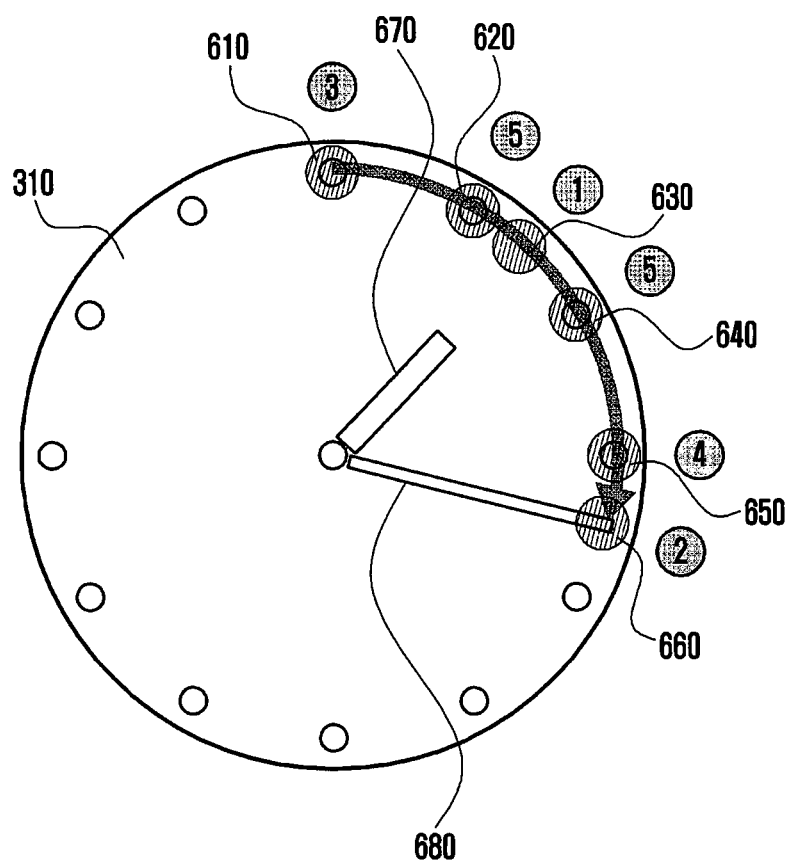
FIG. 6 and FIG. 7 illustrate examples of providing time information in an electronic device according to various embodiments of the disclosure.
Figure 7:
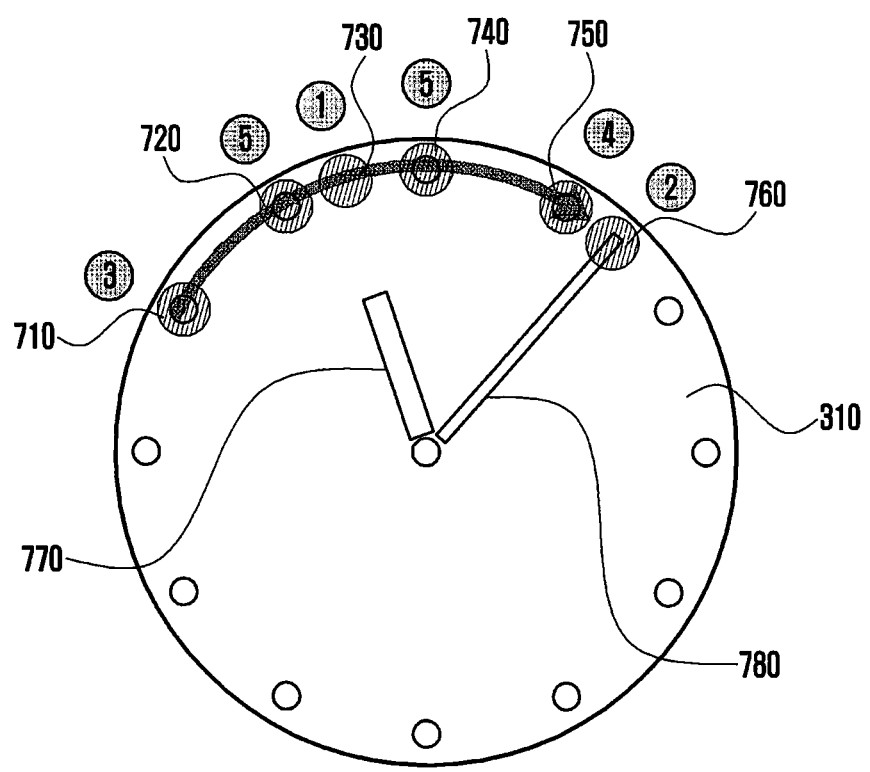

FIG. 6 and FIG. 7 illustrate examples of providing time information in an electronic device according to various embodiments of the disclosure.

FIG. 6 illustrates a vibration pattern from a position 610 at which a user input starts to a position 660 at which the user input is finally detected when the user input is a drag input and the position 610 where the user input starts is the same as a region indicating 12 o'clock in an existing clock.

FIG. 7 illustrates a vibration pattern from a position 710 at which a user input starts to a position 760 at which the user input is finally detected when the user input is a drag input and the position 710 where the user input starts is different from a region indicating 12 o'clock in an existing clock.

According to various embodiments of the disclosure, a processor (e.g., the processor 330 of FIG. 3) may detect the start of a user input and may identify the start position 610 and 710 of the user input. Upon detecting the start of the user input, the processor 330 may identify first time information 670 and 770 and second time information 680 and 780. Assuming that the time when the user input starts is 1:20, the first time information may indicate 1 o'clock, and the second time information may indicate 20 minutes.

The processor 330 may determine a first region, based on the start position 610 and 710 of the user input and the difference between the first time information 670 and 770 and a reference time. Since the first time information 670 and 770 is 1 o'clock and the reference time is 12 o'clock, a region 620 and 720 corresponding to a one-hour difference from the start position 610 and 710 may be set as the first region. According to another embodiment, instead of the region 620 and 720 corresponding to the one-hour difference, a region 630 and 730 farther from the start position 610 and 710 than the region 620 and 720 corresponding to the one-hour difference may be set as the first region considering that an hour hand moves as a minute hand changes as in a real clock.

The processor 330 may determine a second region, based on the start position 610 and 710 of the user input and the difference between the second time information 680 and 780 and the reference time. Since the second time information 680 and 780 is 20 minutes and a minute corresponding to the reference time is 0 minutes, a region 660 and 760 corresponding to a 20-minute difference from the start position 610 and 710 may be set as the second region.

According to various embodiments of the disclosure, the processor 330 may determine at least one region indicating the position of the user input on a display (e.g., the display 310 of FIG. 3), based on the start position 610 and 710 of the user input. For example, the processor 330 may determine a region 620 and 720 indicating a position corresponding to a one-o'clock direction, a region 640 and 740 indicating a position corresponding to a two-o'clock direction, and a region 650 and 750 indicating a position corresponding to a three-o'clock direction, based on the reference time (12 o'clock) corresponding to the start position 610 and 710 of the user input.

According to various embodiments of the disclosure, upon detecting the start of the user input, the processor 330 may control an actuator to output a vibration ③. The processor 330 may control the actuator 320 to output a vibration ⑤ upon detecting the user input at the position 620 and 720 corresponding to the one-o'clock direction. The processor 330 may control the actuator 320 to output a first vibration ① corresponding to the first time information 670 and 770 upon detecting the user input in the first region 630 and 730. The processor 330 may control the actuator 320 to output the vibration upon detecting the user input at the position 640 and 740 corresponding to the two-o'clock direction, and may control the actuator 320 to output a vibration ④ upon detecting the user input at the position 650 and 750 corresponding to the three-o'clock direction. The processor 330 may control the actuator 320 to output a second vibration ② upon detecting the user input in the second region 660 and 760.

Comparing an example illustrated in FIG. 6 with an example illustrated in FIG. 7, the start positions of the user inputs are different. As the start positions of the user inputs are different, first regions and second regions are determined to be different positions. However, both in the example illustrated in FIG. 6 and the example illustrated in FIG. 7, the same time information (e.g., 1:20) may be notified to the user.

Figure 8:
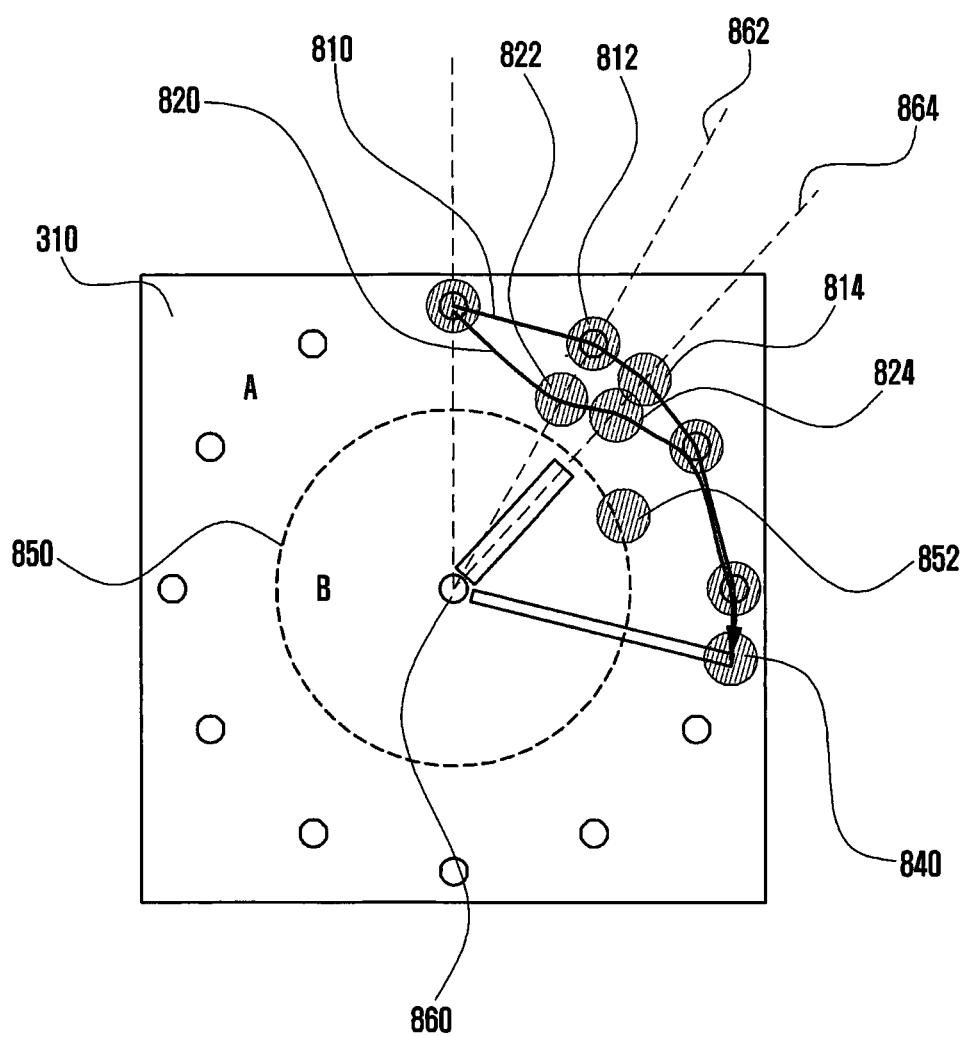
FIG. 8 illustrates another example of providing time information in an electronic device according to various embodiments of the disclosure.

FIG. 8 illustrates another example of providing time information in an electronic device according to various embodiments of the disclosure.

According to various embodiments of the disclosure, in outputting time information using vibrations, the electronic device (e.g., the electronic device 300 of FIG. 3) may set a touch-active region and a touch-inactive region on a display (e.g., the display 310 of FIG. 3), and may output a vibration upon a user input in the touch-active region.

For example, a processor (e.g., the processor 330 of FIG. 3) of the electronic device 300 may set an inside B of a concentric circle 850 with a specific point of the display 310 (e.g., the center of the display 310) as the center as the touch-inactive region and may set an outside A of the concentric circle 850 as the touch-active region.

When a user input is performed in a region close to the center of the display 310, the user input may be completed within a time shorter than a time taken to output a vibration, thus making it inconvenient to provide time information using the vibration. In order to solve this disadvantage, the processor 330 may set the inside B of the concentric circle 850 as the touch-inactive region, and may not output time information using a vibration when detecting a user input in the touch-inactive region.

According to various embodiments of the disclosure, when a user input is detected at the boundary between the touch-active region A and the touch-inactive region B, the processor 330 may control an actuator 320 to output a vibration different from that for outputting time information. In FIG. 8, when a user input is detected at a specific position 852 on the boundary between the touch-active region A and the touch-inactive region B, the processor 330 may control the actuator 320 to output a vibration different from that for outputting time information.

According to various embodiments of the disclosure, when a user input is detected in the touch-active region A, the processor 330 may control the actuator 320 to output the same vibration on any point meeting a line in a direction from the center of the display 310 to the edge of the display 310. The processor 330 may control the actuator 320 to output the same vibration on any point meeting the line in the direction to the edge of the display 310 regardless of the path of the user input.

Comparing two user inputs 810 and 820 having the same start position 830, the same end position 840, and partially different paths illustrated in FIG. 8, the processor 330 may control the actuator 320 to output the same vibration ⑤ when detecting the user inputs at positions 812 and 822 meeting a line 862 extending from the center 860 of the display 310 to the edge thereof. The processor 330 may control the actuator 320 to output the same vibration ① when detecting the user inputs at positions 814 and 824 meeting a line 864 extending from the center 860 of the display 310 to the edge thereof.

Figure 9:
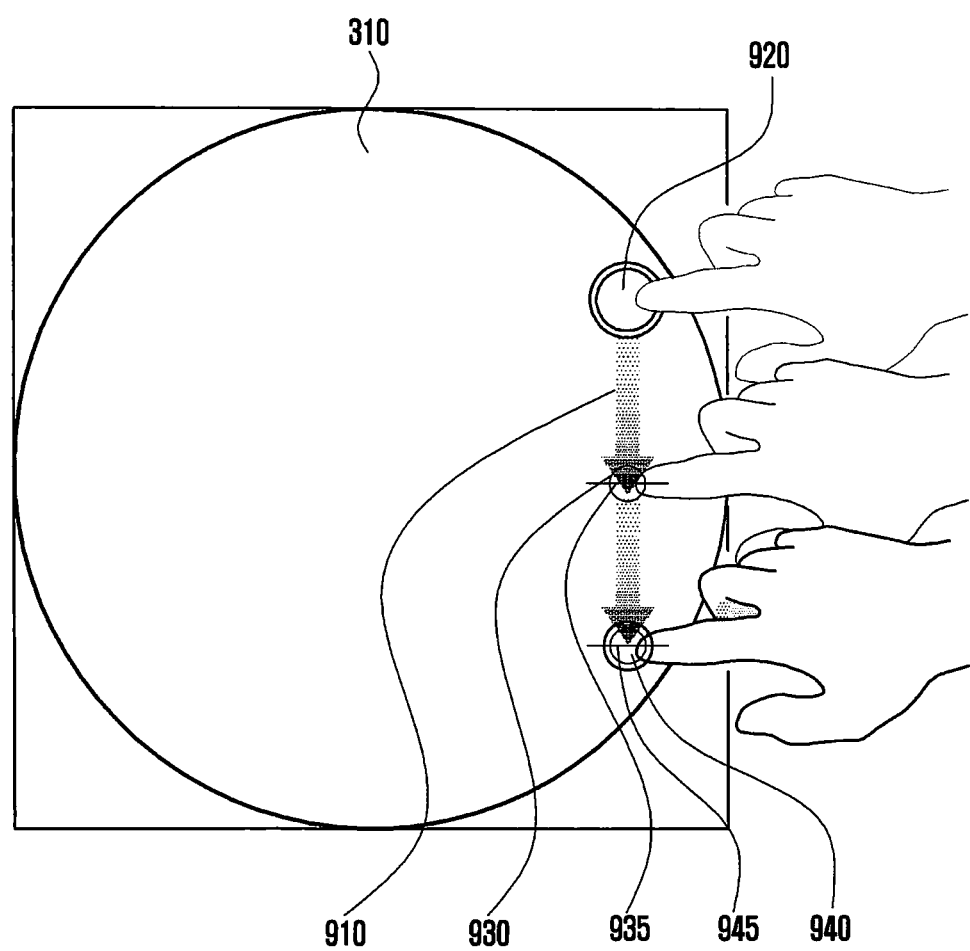
FIG. 9 illustrates an example of providing time information according to the length of a user input in an electronic device according to various embodiments of the disclosure.

FIG. 9 illustrates an example of providing time information according to the length of a user input in an electronic device according to various embodiments of the disclosure.

According to various embodiments of the disclosure, a processor (e.g., the processor 330 of FIG. 3) may obtain first time information and second time information upon detecting a user input. According to various embodiments of the disclosure, the first time information may include hour information corresponding to the time at which the user input is received, and the second time information may include minute information corresponding to the time at which the user input is received.

According to various embodiments of the disclosure, the user input may be a drag input. The processor 330 may identify whether the user input is moved by a first setting value or longer, and may control an actuator (e.g., the actuator 320 of FIG. 3) to output a first vibration indicating the first time information when the current position 930 of the user input is moved by the first setting value 935 or longer from the start position 910 of the user input. The processor 330 may identify whether the user input is moved by a second setting value 945 or longer, where the second setting value 945 is greater than the first setting value 935, and may control the actuator 320 to output a second vibration indicating the second time information when the current position 940 of the user input is moved by the second setting value 945 or longer from the start position 910 of the user input.

According to various embodiments of the disclosure, a vibration indicating time information may be output in various patterns. For example, 5 may be set to one vibration having a long period and 1 may be set to one vibration having a relatively short period, thereby representing a number corresponding to time information using a vibration. For example, 12 may be realized by two vibrations having a long period and two vibrations having a short period. According to various embodiments of the disclosure, each of the first time information and the second time information may be represented by a vibration corresponding to a number, and the processor 330 may identify the first time information and the second time information and may determine patterns for the first vibration and the second vibration. The processor 330 may control the actuator 320 to output the first vibration having a pattern determined corresponding to the movement of the user input by the first setting value or longer, thereby providing the first time information to a user. The processor 330 may control the actuator 320 to output the second vibration having a pattern determined corresponding to the movement of the user input by the second setting value or longer, thereby providing the second time information to the user.

Figure 10:
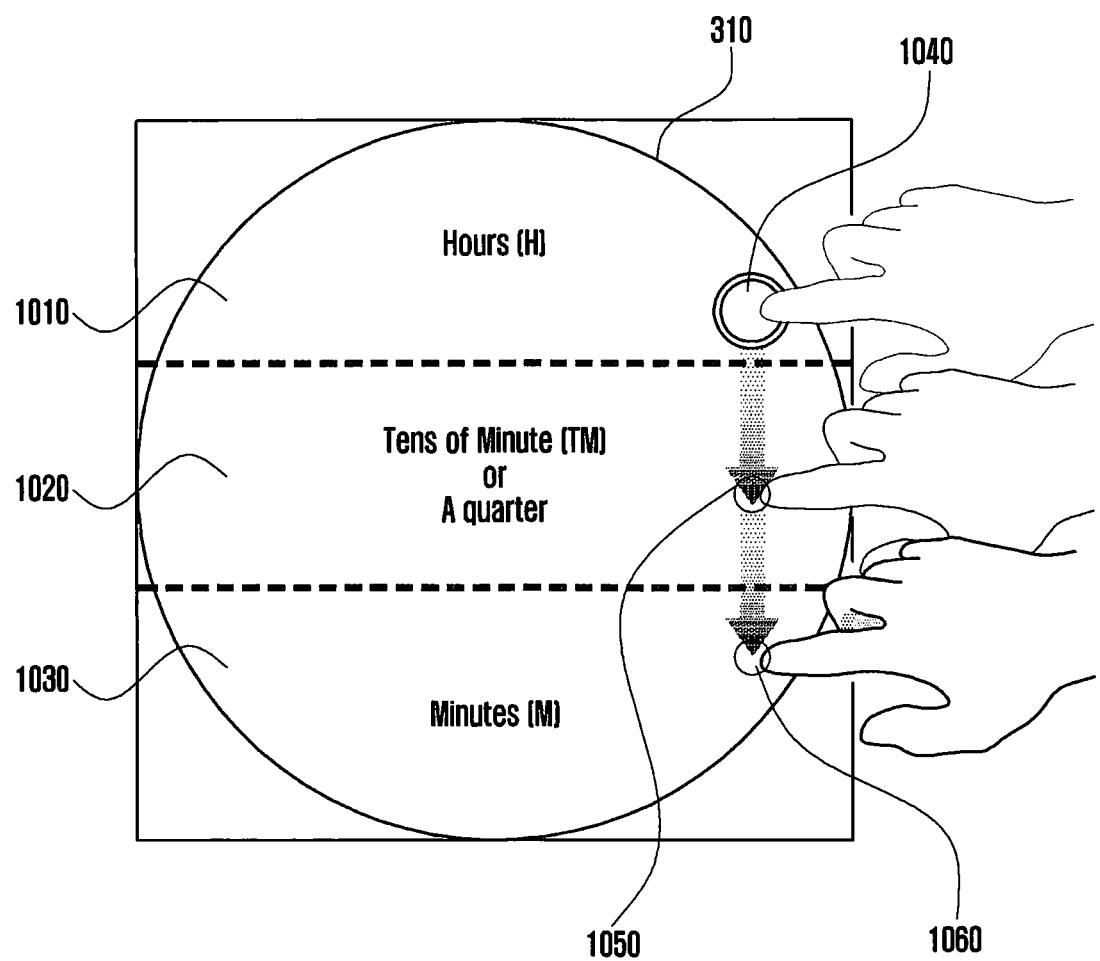
FIG. 10 illustrates an example of providing time information according to a position at which a user input is detected in an electronic device according to various embodiments of the disclosure.

FIG. 10 illustrates an example of providing time information according to a position at which a user input is detected in an electronic device according to various embodiments of the disclosure.

According to various embodiments of the disclosure, a processor (e.g., the processor 330 of FIG. 3) may obtain first time information, second time information, and third time information upon detecting a user input. Referring to FIG. 10, the first time information may include hour information corresponding to the time at which the user input is received, and the second time information and third time information may include minute information corresponding to the time at which the user input is received. The second time information may indicate minute information in ten minutes of the minute information, and the third time information may indicate minute information in minutes of the minute information.

According to various embodiments of the disclosure, time information may be provided in various manners. For example, time information in minutes may also be provided in 15 minutes (quarters) instead of 10 minutes. Referring to FIG. 10, the first time information may include hour information of a current time, the second time information may include information in 15 minutes of minute information of the current time, and the third time information may include minute information of the minute information of the current time excluding the minute information included in the second time information.

According to various embodiments of the disclosure, the processor 330 may set a region for transmitting the first time information and the second time information through vibrations. For example, the processor 330 may set a first region 1010 corresponding to the first time information, a second region 1020 corresponding to the second time information, and a third region 1030 corresponding to the third time information.

According to various embodiments of the disclosure, the processor 330 may control an actuator 320 to output a first vibration indicating the first time information upon detecting a user input in one region 1040 of the first region 1010, to output a second vibration indicating the second time information upon detecting the user input in one region 1050 of the second region 1020, and to output a third vibration indicating the third time information upon detecting the user input in one region 1060 of the third region 1030.

According to various embodiments of the disclosure, a vibration indicating time information may be output in various patterns. For example, 5 may be set to one vibration having a long period and 1 may be set to one vibration having a relatively short period, thereby representing a number corresponding to time information using a vibration. For example, 12 may be realized by two vibrations having a long period and two vibrations having a short period. According to various embodiments of the disclosure, each of the first time information, the second time information, and the third time information may be represented by a vibration corresponding to a number, and the processor 330 may identify the first time information, the second time information, and the third time information and may determine patterns for the first time information, the second time information, and the third time information.

Figure 11A:
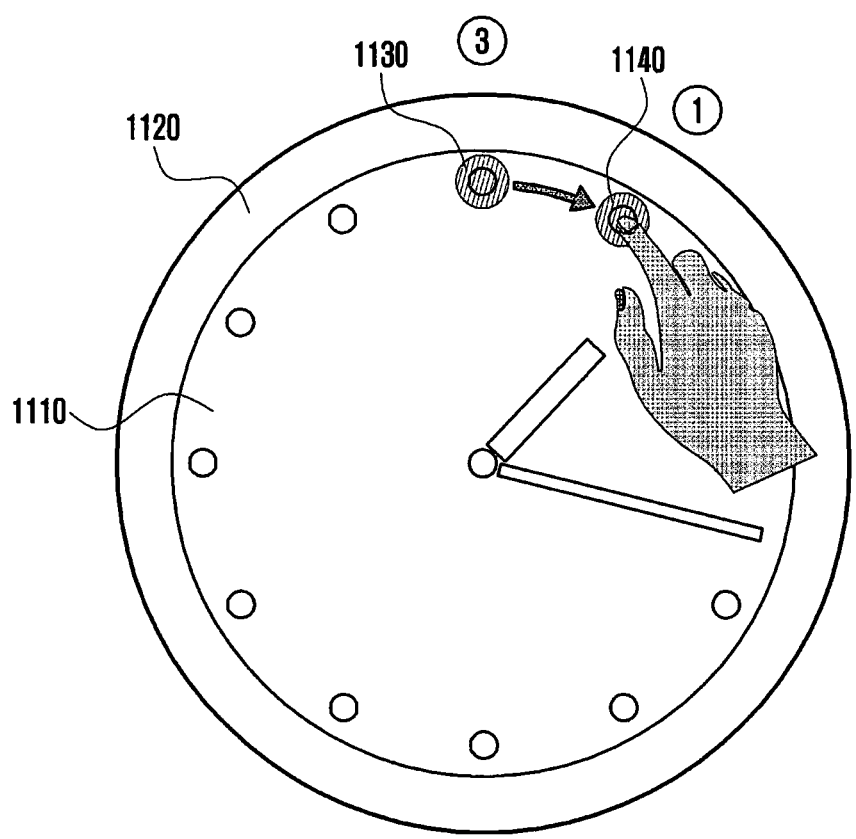
FIG. 11A and FIG. 11B illustrate examples of providing time information using a rotatable bezel in an electronic device according to various embodiments of the disclosure.
Figure 11B:
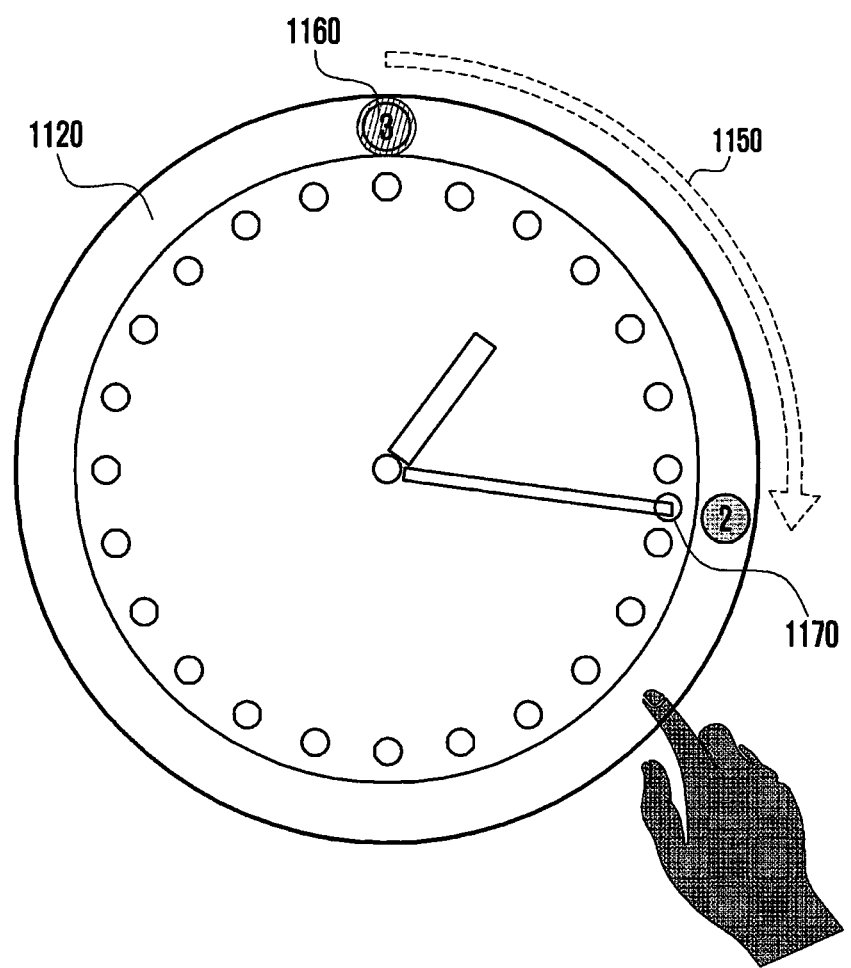

FIG. 11A and FIG. 11B illustrate examples of providing time information using a rotatable bezel in an electronic device according to various embodiments of the disclosure.

According to various embodiments of the disclosure, the electronic device (e.g., the electronic device 300 of FIG. 3) may further include a rotatable bezel 1120. The electronic device 300 may detect a user input to rotate the rotatable bezel 1120. The electronic device 300 may analyze the user input to rotate the rotatable bezel 1120 and may perform various interactions according to the rotation direction and the rotation length of the rotatable bezel 1120 and various inputs on a display 1110, such as a touch input, a proximity input, and the like.

According to various embodiments of the disclosure, the electronic device 300 may include at least one stopper. While rotating the rotatable bezel 1120, the bezel may be engaged with the stopper, thus temporarily stopping the movement of the rotatable bezel 1120. The stopper may be connected with a spring material. Thus, when force is applied to the rotatable bezel 1120 again, the rotatable bezel 1120 may be rotated again. The number of times the movement of the rotatable bezel 1120 is temporarily stopped may be determined according to the number of stoppers. When the movement of the rotatable bezel 1120 is temporarily stopped as many times as the number of stoppers included in the rotatable bezel 1120, it may be considered that the rotatable bezel 1120 performs one rotational movement with respect to an edge portion of the electronic device 300. Therefore, the number of times the movement of the rotatable bezel 1120 is temporarily stopped by the stopper may be an indicator of how much the bezel is moved.

According to various embodiments of the disclosure, when the electronic device 300 further includes the rotatable bezel 1120, the electronic device 300 may provide time information according to a user input on the display 1110 and a user input to rotate the rotatable bezel 1120.

Referring to FIG. 11A, the electronic device 300 may detect a user input on the display 1110. A processor (e.g., the processor 330 of FIG. 3) of the electronic device 300 may identify the start position 1130 of the user input and may determine a first region 1140, based on the start position 1130 and first time information (hour information corresponding to the start of the user input). When the user input is detected in the first region 1140, the processor 330 may control an actuator (e.g., the actuator 320 of FIG. 3) to output a vibration indicating the first time information.

Referring to FIG. 11B, the electronic device 300 may detect a user input 1150 to rotate the rotatable bezel 1120. The processor 330 of the electronic device 300 may determine a second region 1170, based on the start position 1160 of the user input 1150 and second time information (minute information corresponding to the start of the user input). When the user input 1150 is detected in the second region 1170, the processor 330 may control the actuator 320 to output a vibration indicating the second time information. A user may recognize the second time information using the number of times the rotatable bezel 1120 is temporarily stopped by the stopper from the start of the user input to the time when the vibration indicating the second time information is output.

Figure 12A:
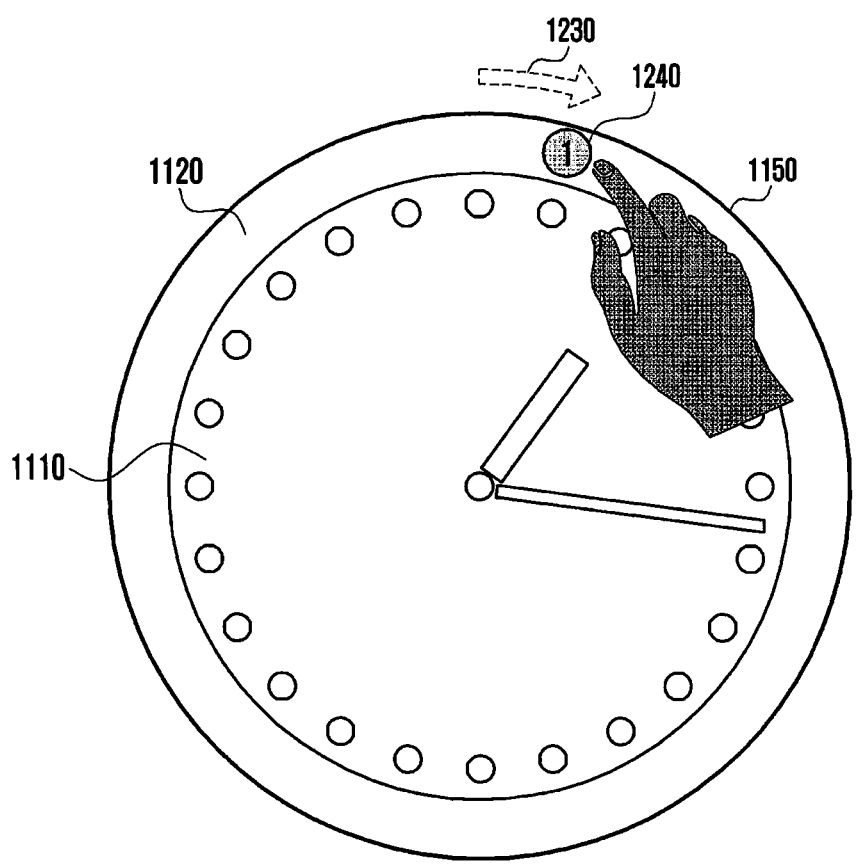
FIG. 12A and FIG. 12B illustrate examples of providing time information according to the rotation direction of a user input to rotate a rotatable bezel in an electronic device according to various embodiments of the disclosure.
Figure 12B:
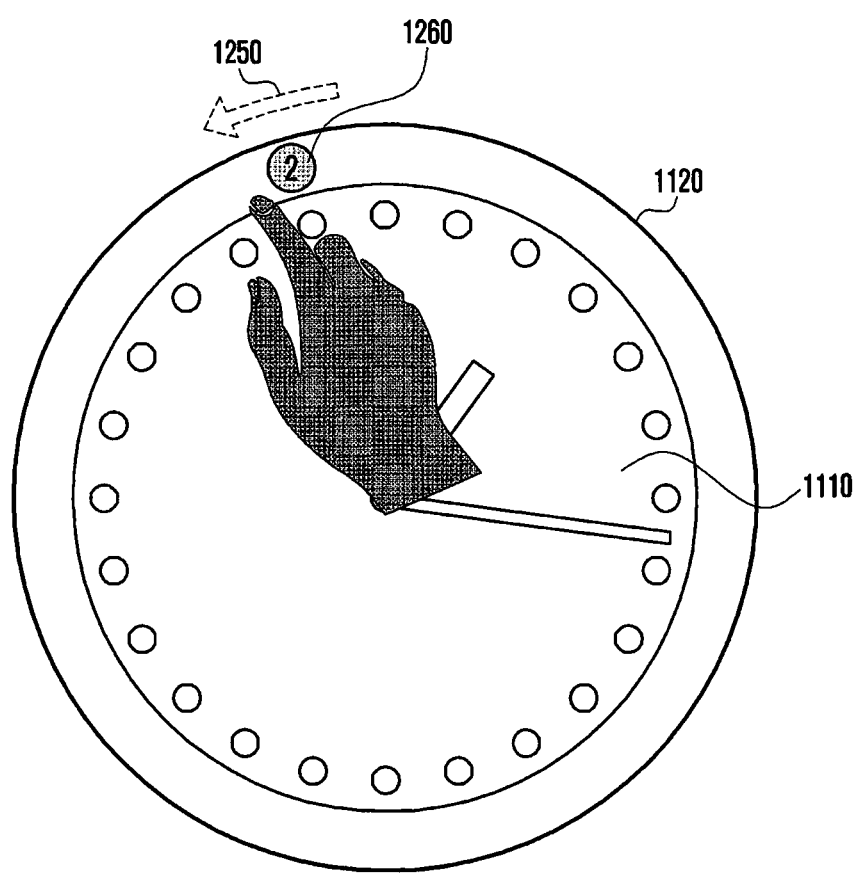

FIG. 12A and FIG. 12B illustrate examples of providing time information according to the rotation direction of a user input to rotate a rotatable bezel in an electronic device according to various embodiments of the disclosure.

According to various embodiments of the disclosure, the electronic device (e.g., the electronic device 300 of FIG. 3) may provide various pieces of time information according to the rotation direction of the rotatable bezel by a user input.

According to various embodiments of the disclosure, the electronic device 300 may detect a user input for the rotatable bezel 1120 and may identify the direction of the user input. The electronic device 300 may output different pieces of time information according to the direction of the user input. As described above, time information may be transmitted to a user by outputting a vibration indicating the time information. When the electronic device 300 includes a speaker to output a sound, time information may be transmitted to the user by outputting a sound indicating the time information.

Referring to FIG. 12A, the electronic device 300 may detect a user input 1230 in a clockwise direction with respect to the rotatable bezel 1120. For example, the user may perform the user input 1230 until the rotatable bezel 1120 is stopped by a stopper 1240. The electronic device 300 may output first time information (hour information of an input time for the rotatable bezel) when the rotatable bezel 1120 rotates in the clockwise direction. According to various embodiments of the disclosure, the electronic device 300 may output a vibration indicating the first time information. According to another embodiment of the disclosure, the electronic device 300 may transmit the first time information to the user by outputting a sound including the first time information.

Referring to FIG. 12B, the electronic device 300 may detect a user input 1250 in a counterclockwise direction with respect to the rotatable bezel 1120. For example, the user may perform the user input 1250 until the rotatable bezel 1120 is stopped by a stopper 1250. The electronic device 300 may output second time information (minute information of an input time for the rotatable bezel) when the rotatable bezel 1120 rotates in the counterclockwise direction. According to various embodiments of the disclosure, the electronic device 300 may output a vibration indicating the second time information. According to another embodiment of the disclosure, the electronic device 300 may transmit the first time information to the user by outputting a sound including the second time information.

Figure 13A:
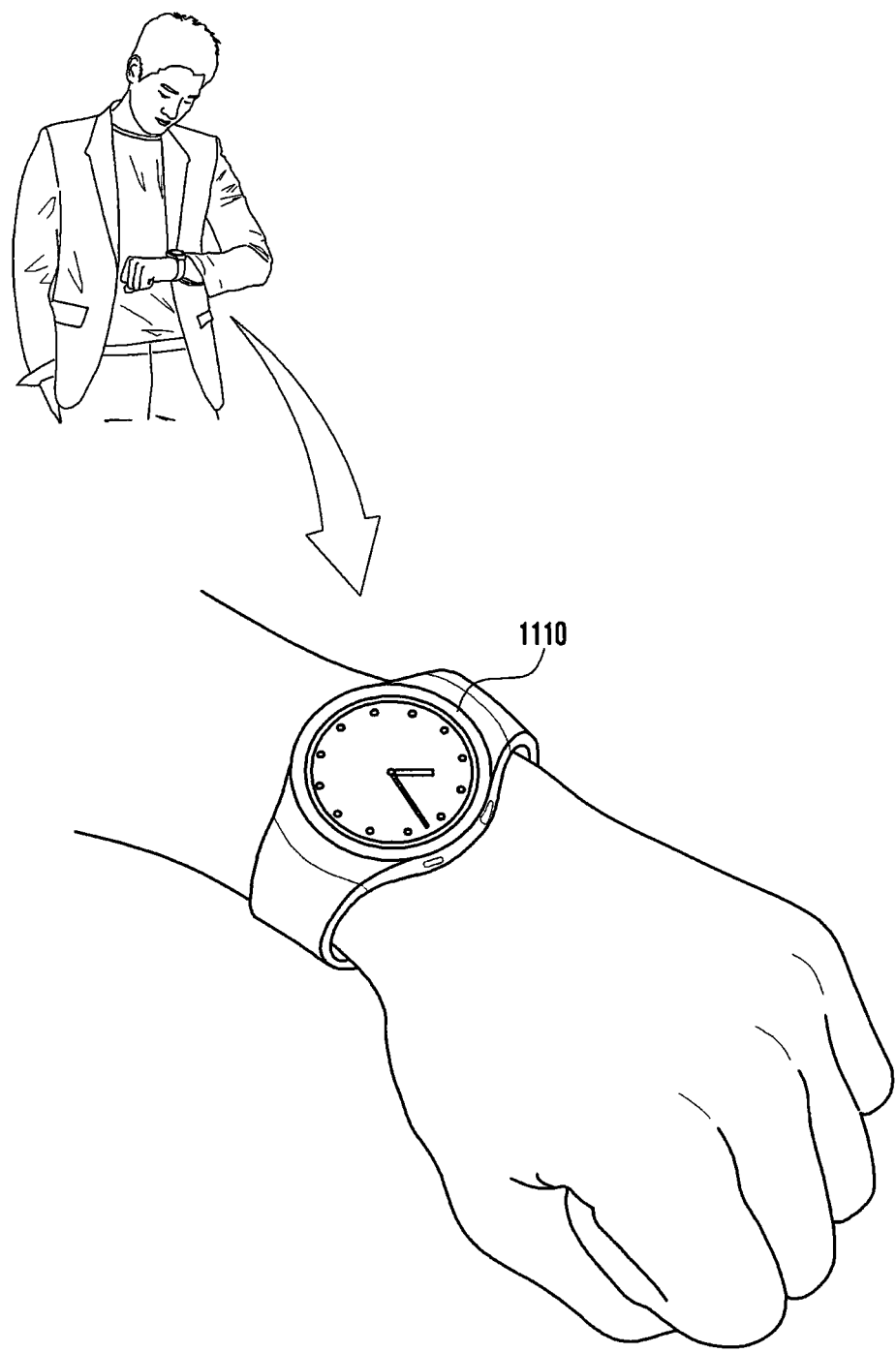
FIG. 13A to FIG. 13C illustrate examples of providing time information of an electronic device in the electronic device according to various embodiments of the disclosure.

FIG. 13A illustrates an example of providing time information in an electronic device according to various embodiments of the disclosure.

The electronic device (e.g., the electronic device 300 of FIG. 3) may include various sensors to identify the posture of the electronic device 300. According to various embodiments of the disclosure, the electronic device 300 may further include a gyroscope sensor and may identify a change in the posture of the electronic device 300, based on information detected by the gyroscope sensor.

According to various embodiments of the disclosure, the electronic device 300 may identify a change in the posture of the electronic device 300 by a movement of a user of the electronic device 300. Referring to FIG. 13A, the electronic device 300 may detect a change in the posture of the electronic device 300 due to a movement of the user lifting an arm wearing the electronic device 300 towards the chest.

According to various embodiments of the disclosure, upon detecting the change in the posture of the electronic device 300 due to a movement of the user lifting an arm wearing the electronic device 300 towards the chest, the electronic device 300 may provide time information. For example, the electronic device 300 may display the time information on a display 1110. In another example, the electronic device 300 may control an actuator (e.g., the actuator 320 of FIG. 3) to output a vibration corresponding to the time information.

According to various embodiments of the disclosure, the electronic device 300 may collect various pieces of information and may determine a method for outputting time information (e.g., a method of displaying time information, a method of outputting time information as a sound, or a method of outputting time information as a vibration) based on the collected information.

According to various embodiments of the disclosure, the electronic device 300 may receive time information, may analyze the time information, and may determine a method for outputting the time information. For example, when the current time is 3:00 a.m., the electronic device 300 may determine to output time information as a vibration, because it is usually dark at 3:00 a.m. and displaying time information or outputting time information as a sound may incur inconvenience to the user.

According to various embodiments of the disclosure, the electronic device 300 may determine a method for outputting time information, based on location information collected by a GPS sensor of the electronic device 300. For example, when the current location of the electronic device 300 is identified as a library, the electronic device 300 may determine to output time information as a vibration, because the library is a space requiring quietness and providing time information using a sound may incur inconvenience to the user.

Figure 13B:
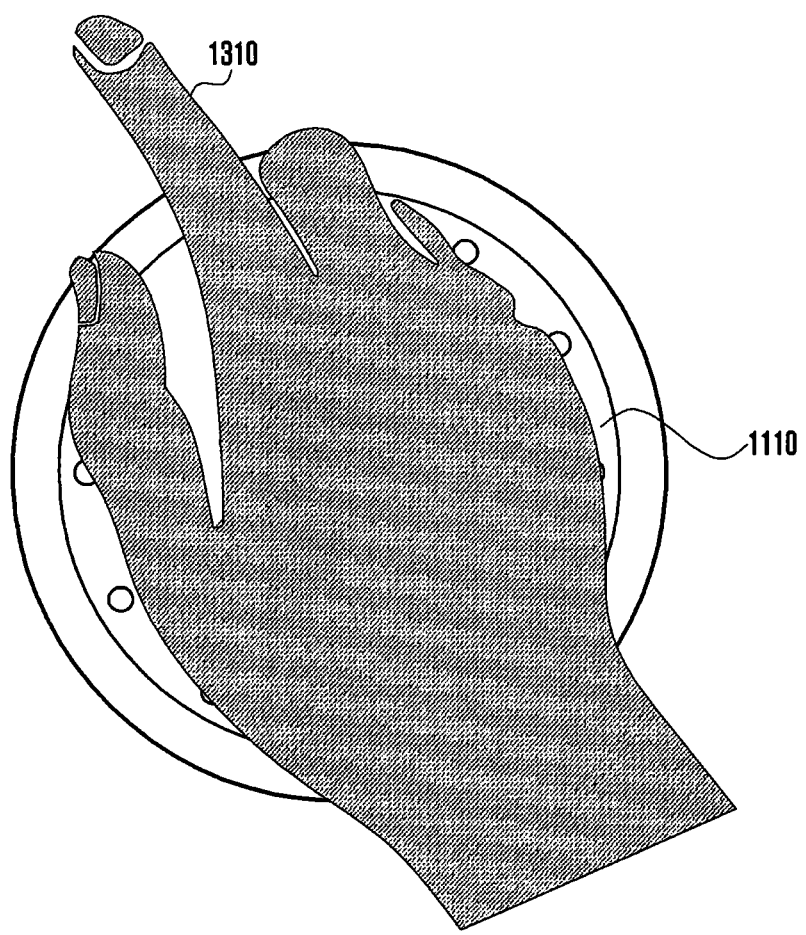

FIG. 13B illustrates an example of stopping provision of time information in an electronic device according to various embodiments of the disclosure.

The electronic device (e.g., the electronic device 300 of FIG. 3) may detect a user input on a display (e.g., the display 1110 of FIG. 11). As illustrated in FIG. 13B, the user input may include a user input covering a portion of the display 1110. A processor (e.g., the processor 330 of FIG. 3) may identify the size of a region occupied by a user input on the display 1110.

When the identified size of the region exceeds a set size (or is the set size or greater), the processor 330 may control an actuator (e.g., the actuator 320 of FIG. 3) to stop or suspend outputting a vibration indicating time information. When the identified size of the region exceeds the set size (or is the set size or greater), the processor 330 may control the actuator to stop or suspend outputting a sound indicating time information.

Figure 13C:
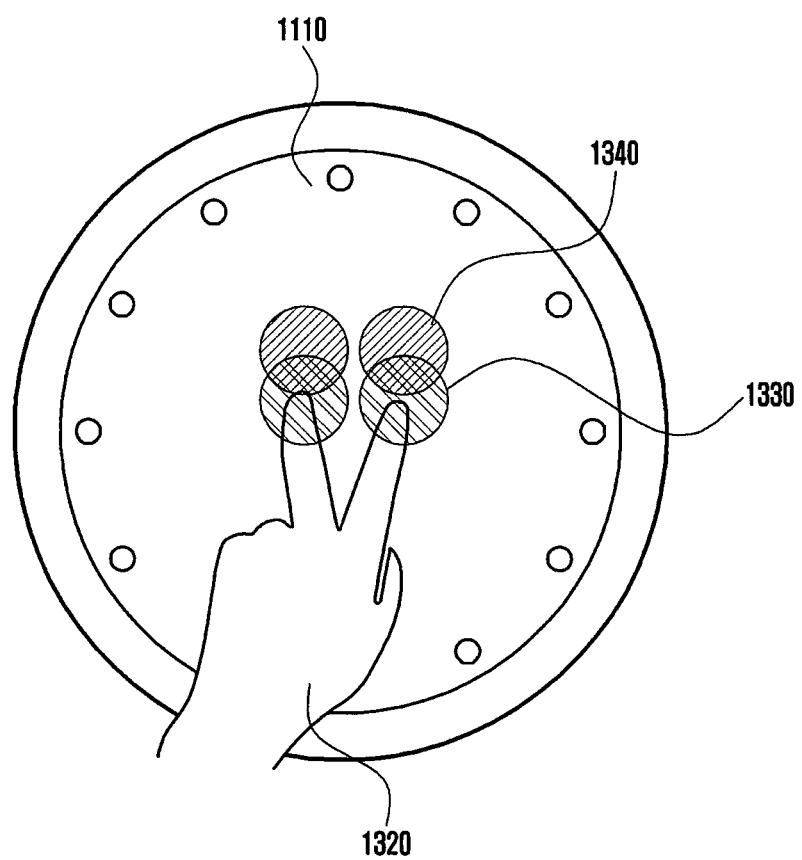

FIG. 13C illustrates an example of stopping provision of time information in an electronic device according to various embodiments of the disclosure.

According to various embodiments of the disclosure, a user input may include an input of double tapping 1330 and 1340 on the display 1110 with two fingers 1320 among the user's fingers. The processor 330 may stop or suspend outputting a vibration indicating time information or outputting a sound indicating time information in response to an input of double tapping on a screen with two fingers of the user.

According to various embodiments of the disclosure, in response to a user input to stop providing time information (e.g., the user input 1310 of FIG. 13B or the user input 1330 and 1340 of FIG. 13C), the processor 330 may control the actuator 320 to continue outputting a vibration indicating the time information while stopping or suspending outputting a sound indicating the time information.

According to various embodiments of the disclosure, first time information may include hour information, and second time information may include minute information. However, the first time information and the second time information may include various pieces of time information, without being limited to the above examples. For example, the first time information may include minute information, and the second time information may include hour information. In another example, the first time information may include minute information, and the second time information may include second information. That is, the first time information and the second time information may include various pieces of time information including a time.

An electronic device according to various embodiments may include: a display to display first time information and second time information; an actuator configured to output vibrations respectively corresponding to the first time information and the second time information; and a processor, wherein the processor may: identify a start position of a user input upon detecting a start of the user input on the display; determine, based on the start position, a first region corresponding to the first time information and a second region corresponding to the second time information; control the actuator to output a first vibration indicating the first time information upon detecting the user input in the first region; and control the actuator to output a second vibration indicating the second time information upon detecting the user input in the second region.

In the electronic device according to various embodiments of the disclosure, the processor may be configured to set the start position of the user input as a reference time, to determine the first region, based on the start position and a difference between the reference time and the first time information, and to determine the second region, based on the start position and a difference between the reference time and the second time information.

In the electronic device according to various embodiments of the disclosure, the processor may be configured to determine an hour corresponding to the start of the user input as the first time information and to determine a minute corresponding to the start of the user input as the second time information.

In the electronic device according to various embodiments of the disclosure, the processor may be configured to determine at least one region indicating a position of the user input on the display, based on the start position of the user input, and to control the actuator to output a third vibration indicating the position on the display when the user input is detected in the determined region.

In the electronic device according to various embodiments of the disclosure, the first vibration and the second vibration may be set differently in at least one of a vibration count, a vibration strength, vibration duration, and a vibration direction.

In the electronic device according to various embodiments of the disclosure, the processor may be configured to determine a third region corresponding to third time information, based on the start position of the user input, and to control the actuator to output a third vibration corresponding to the third time information upon detecting the user input in the third region.

The electronic device according to various embodiments of the disclosure may further include a rotatable bezel, wherein the processor may be configured to receive a second input to rotate the bezel, and to control the actuator to output the second vibration upon detecting the second input in the second region.

In the electronic device according to various embodiments of the disclosure, the processor may be configured to receive the user input to rotate the rotatable bezel, to control the actuator to output the first vibration upon identifying that a rotation direction of the bezel is a first direction, and to control the actuator to output the second vibration upon identifying that the rotation direction of the bezel is a second direction.

In the electronic device according to various embodiments of the disclosure, the processor may be configured to identify a size of a region occupied by the user input on the display, and to control the actuator to suspend outputting a vibration when the size of the region exceeds a set size.

In the electronic device according to various embodiments of the disclosure, the processor may be configured to set a region within a set range from a preset point on the display as a touch-inactive region, to set a region other than the touch-inactive region on the display as a touch-active region, and to control the actuator to output a vibration indicating that the user input is positioned in the touch-inactive region upon detecting the user input in the touch-inactive region.

An electronic device according to various embodiments of the disclosure may include: a display to display first time information and second time information; an actuator configured to output vibrations respectively corresponding to the first time information and the second time information; and a processor, wherein the processor may be configured to detect the start of the user input, and to control the actuator to output the first vibration indicating the first time information when the user input is moved by a first setting value or greater and to output the second vibration indicating the second time information when the user input is moved by a second setting value or greater, the second setting value being greater than the first setting value.

In the electronic device according to various embodiments of the disclosure, the processor may be configured to control the actuator to output a third vibration corresponding to third time information when the user input is moved by a third setting value or greater.

In the electronic device according to various embodiments of the disclosure, the user input may be a drag input.

Figure 14:
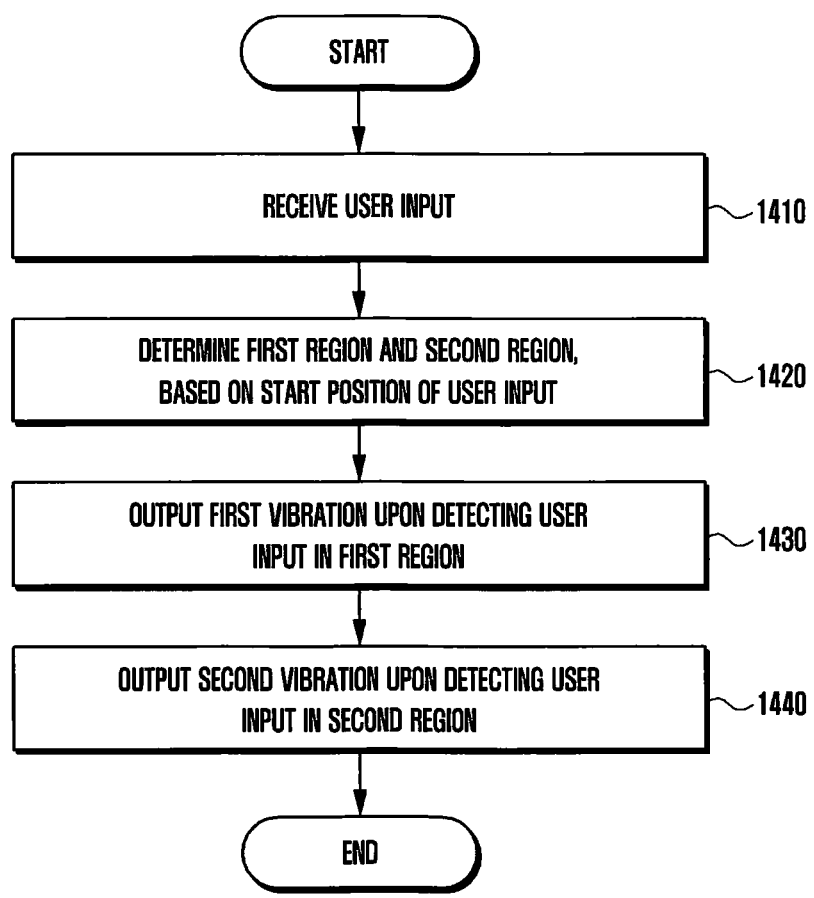
FIG. 14 is a flowchart illustrating an operating method of an electronic device according to various embodiments of the disclosure.

FIG. 14 is a flowchart illustrating an operating method of an electronic device according to various embodiments of the disclosure.

Referring to FIG. 14, in operation 1410, a processor (e.g., the processor 330 of FIG. 3) of the electronic device (e.g., the electronic device 300 of FIG. 3) may receive a user input. According to various embodiments of the disclosure, the user input may include a touch input by a user on a display (e.g., the display 310 of FIG. 3) and a proximity input by the user on the display 310, and may include an input to a rotatable bezel by the user when the electronic device 300 includes the rotatable bezel (e.g., the rotatable bezel 1120 of FIG. 11).

In operation 1420, the processor 330 may determine a first region and a second region, based on the start position of the user input.

According to various embodiments of the disclosure, the start position of the user input may be set as a reference position, and the difference between the first region and the reference position may be determined corresponding to the difference between first time information and a reference time. The processor 330 may determine the first region, based on the start position and the difference between the first time information and the reference time.

According to various embodiments of the disclosure, the difference between the second region and the reference position may be determined corresponding to the difference between second time information and the reference time. The processor 330 may determine the second region, based on the difference between the start position and the difference between the second time information and the reference time.

In operation 1430, the electronic device 300 may output a first vibration indicating the first time information upon detecting the user input in the first region. To this end, the processor 330 may control an actuator 320 to output the first vibration.

In operation 1440, the electronic device 300 may output a second vibration indicating the second time information upon detecting the user input in the second region. To this end, the processor 330 may control the actuator 320 to output the second vibration.

Figure 15:
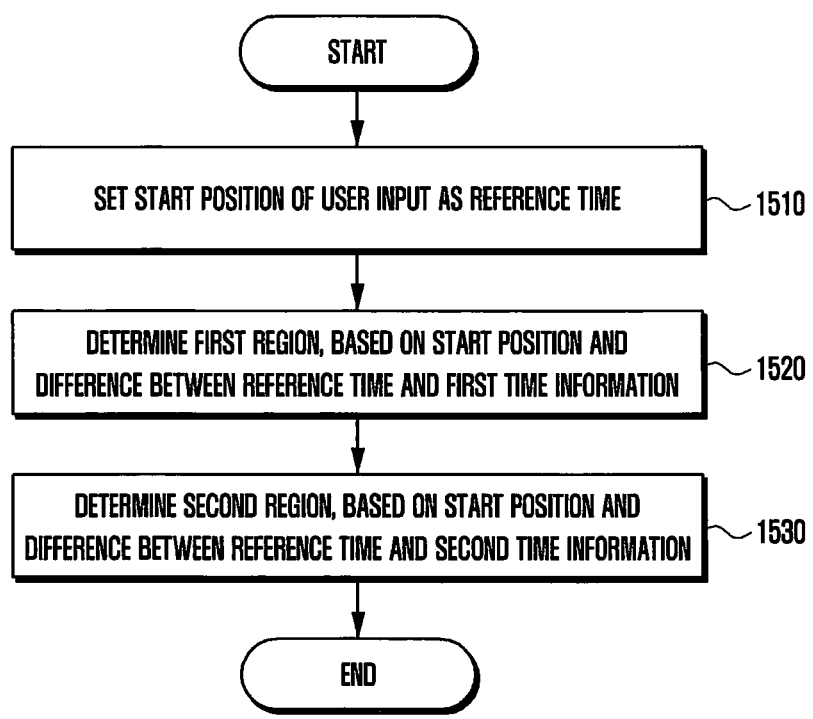
FIG. 15 is a flowchart illustrating an operation of determining a first region and a second region in an operating method of an electronic device according to various embodiments of the disclosure.

FIG. 15 is a flowchart illustrating an operation of determining a first region and a second region in an operating method of an electronic device according to various embodiments of the disclosure.

In operation 1510, a processor (e.g., the processor 330 of FIG. 3) of the electronic device (e.g., the electronic device 300 of FIG. 3) may set the start position of a user input as a reference position. According to various embodiments of the disclosure, the reference position is a position corresponding to a reference time, and the reference time may be 12 o'clock.

In operation 1520, the processor 330 may determine a first region, based on the start position of the user input and the difference between the reference time and first time information. According to various embodiments of the disclosure, the first time information may include hour information of the time at which the user input starts. The processor 330 may determine the relative position of the first region to the reference position, based on the difference between the first time information and the reference time, and may determine the first region, based on the identified start position of the user input and the relative position.

In operation 1530, the processor 330 may determine a second region, based on the start position of the user input and the difference between the reference time and second time information. According to various embodiments of the disclosure, the second time information may include minute information of the time at which the user input starts. The processor 330 may determine the relative position of the second region to the reference position, based on the difference between the second time information and the reference time, and may determine the second region, based on the identified start position of the user input and the relative position.

An operating method of an electronic device according to various embodiments of the disclosure may include: receiving a user input; determining, based on a start position of the user input, a first region corresponding to first time information and a second region corresponding to second time information; outputting a first vibration indicating the first time information upon detecting the user input in the first region; and outputting a second vibration indicating the second time information upon detecting the user input in the second region.

In the operating method of the electronic device according to various embodiments of the disclosure, the determining of the first region and the second region may include setting the start position of the user input as a reference time, determining the first region, based on the start position and a difference between the reference time and the first time information, and determining the second region, based on the start position and a difference between the reference time and the second time information.

In the operating method of the electronic device according to various embodiments of the disclosure, the determining of the first region and the second region may include determining an hour corresponding to the start of the user input as the first time information and determining a minute corresponding to the start of the user input as the second time information.

The operating method of the electronic device according to various embodiments of the disclosure may further include determining at least one region indicating a position of the user input on the display, based on the start position of the user input, and outputting a third vibration indicating the position on the display when the user input is detected in the determined region.

In the operating method of the electronic device according to various embodiments of the disclosure, the second input may include an input to rotate a rotatable bezel included in the electronic device, and the outputting the second vibration may include outputting the second vibration when the rotation length of the bezel is the difference between the start position of the user input and the second region.

The operating method of the electronic device according to various embodiments of the disclosure may further include: receiving a user input to rotate the rotatable bezel; identifying the rotation direction of the user input; outputting the first vibration upon identifying that the rotation direction of the bezel is a first direction; and outputting the second vibration upon identifying that the rotation direction of the bezel is a second direction.

The operating method of the electronic device according to various embodiments of the disclosure may further include: identifying the size of a region occupied by the user input on the display; and suspending outputting a vibration when the size of the region exceeds a set size.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device for providing time information, the electronic device comprising:
   a display configured to display first time information and second time information;
   an actuator configured to output vibrations respectively corresponding to the first time information and the second time information; and
   a processor,
   wherein the processor is configured to:
      identify a start position of a user input upon detecting a start of the user input on the display, the start position being set as a reference time;
      determine a first region corresponding to the first time information based on the start position and a difference between the reference time and the first time information,
      determine a second region corresponding to the second time information based on the start position and a difference between the reference time and the second time information;
      control the actuator to output a first vibration indicating the first time information upon detecting the user input in the first region;
      control the actuator to output a second vibration indicating the second time information upon detecting the user input in the second region;
      identify a size of a region occupied by the user input on the display; and
      control the actuator to suspend outputting the first vibration or the second vibration when the size of the region exceeds a set size.

2. The electronic device as claimed in claim 1, wherein the processor is configured to determine an hour corresponding to the start of the user input as the first time information and to determine a minute corresponding to the start of the user input as the second time information.

3. The electronic device as claimed in claim 1, wherein the processor is configured to determine at least one region indicating a position of the user input on the display, based on the start position of the user input, and to control the actuator to output a third vibration indicating the position on the display when the user input is detected in the determined region.

4. The electronic device as claimed in claim 1, wherein the first vibration and the second vibration are set differently in at least one of a vibration count, a vibration strength, vibration duration, and a vibration direction.

5. The electronic device as claimed in claim 1, wherein the processor is configured to determine a third region corresponding to third time information, based on the start position of the user input, and to control the actuator to output a third vibration corresponding to the third time information upon detecting the user input in the third region.

6. The electronic device as claimed in claim 1, further comprising:
   a rotatable bezel,
   wherein the processor is configured to receive a user input to rotate the bezel, and to control the actuator to output the second vibration upon detecting the user input in the second region.

7. The electronic device as claimed in claim 6, wherein the processor is configured to receive the user input to rotate the rotatable bezel, to control the actuator to output the first vibration upon identifying that a rotation direction of the bezel is a first direction, and to control the actuator to output the second vibration upon identifying that the rotation direction of the bezel is a second direction.

8. The electronic device as claimed in claim 1, wherein the processor is configured to set a region within a set range from a preset point on the display as a touch-inactive region, to set a region other than the touch-inactive region on the display as a touch-active region, and to control the actuator to output a vibration indicating that the user input is positioned in the touch-inactive region upon detecting the user input in the touch-inactive region.

9. The electronic device as claimed in claim 1, wherein the processor is configured to detect the start of the user input, and to control the actuator to output the first vibration indicating the first time information when the user input is moved by a first setting value or greater and to output the second vibration indicating the second time information when the user input is moved by a second setting value or greater, the second setting value being greater than the first setting value.

10. The electronic device as claimed in claim 9, wherein the processor is configured to control the actuator to output a third vibration corresponding to third time information when the user input is moved by a third setting value or greater.

11. The electronic device as claimed in claim 9, wherein the user input is a drag input.

12. An operating method of an electronic device for providing time information, the method comprising:
  receiving a user input;
  identifying a start position of the user input upon detecting a start of the user input on a display, the start position being set as a reference time;
  determining a first region corresponding to first time information based on the start position of the user input and difference between the reference time and the first time information;
  determining a second region corresponding to second time information based on the start position and a difference between the reference time and the second time information;
  outputting a first vibration indicating the first time information upon detecting the user input in the first region;
  outputting a second vibration indicating the second time information upon detecting the user input in the second region;
  identifying a size of a region occupied by the user input on the display; and
  suspending outputting of the first vibration or the second vibration when the size of the region exceeds a set size.

* * * * *